United States Patent
Hikida

(10) Patent No.: US 9,911,067 B2
(45) Date of Patent: Mar. 6, 2018

(54) IMAGE PROCESSING APPARATUS, METHOD OF PROCESSING IMAGE, AND PROGRAM

(71) Applicant: Satoshi Hikida, Kanagawa (JP)

(72) Inventor: Satoshi Hikida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/710,700

(22) Filed: May 13, 2015

(65) Prior Publication Data

US 2015/0332126 A1 Nov. 19, 2015

(30) Foreign Application Priority Data

May 15, 2014 (JP) .................. 2014-101450
Jul. 31, 2014 (JP) .................. 2014-156488
Jan. 16, 2015 (JP) .................. 2015-006529

(51) Int. Cl.
*G06K 9/62* (2006.01)
*H04N 5/232* (2006.01)
(Continued)

(52) U.S. Cl.
CPC ....... *G06K 9/6267* (2013.01); *G06K 9/00288* (2013.01); *G06K 9/00684* (2013.01);
(Continued)

(58) Field of Classification Search
CPC ........... H04N 5/23229; H04N 5/23296; H04N 5/23212; H04N 5/2353; G06K 9/00684;
(Continued)

(56) References Cited

U.S. PATENT DOCUMENTS 5,060,278 A 10/1991 Fukumizu
6,038,337 A * 3/2000 Lawrence ............ G06K 9/4628
382/155
(Continued)

FOREIGN PATENT DOCUMENTS

JP 2940933 6/1999
JP 2940933 8/1999
(Continued)

OTHER PUBLICATIONS

Yichuan Tang: "Deep Learning using Linear Support Vector Machines", Jun. 2, 2013 (Jun. 2, 2013), XP055217371, Retrieved from the Internet: URL:http://arxiv.org/abs/1306.0239 [retrieved on Sep. 29, 2015].

(Continued)

*Primary Examiner* — Luong T Nguyen
(74) *Attorney, Agent, or Firm* — IPUSA, PLLC

(57) ABSTRACT

An image processing apparatus calculating to determine one category, to which an input image data belongs, among categories, which are provided to classify image data, includes a convolution processing unit which performs a convolution process using a first coefficient used for calculating to determine the one category and previously learnt; total combination processing units which are prepared for each category performs a total combination process for a processing result obtained by the convolution processing unit using a second coefficient used for calculating to determine the one category and previously learnt, and calculates to determine the one category; and a normalization unit which performs normalization of a processing result obtained by the total combination processing unit for each category, wherein the convolution processing unit performs learning of the first coefficient in common with the catego- (Continued)

ries, and the total combination processing unit performs learning of the second coefficient for each category.

5 Claims, 34 Drawing Sheets

(51) Int. Cl.

| | | |
|---|---|---|
| H04N 5/235 | (2006.01) | |
| G06K 9/00 | (2006.01) | |
| G06K 9/46 | (2006.01) | |
| G06T 3/40 | (2006.01) | |
| G06K 9/36 | (2006.01) | |

(52) U.S. Cl.
CPC ....... *G06K 9/00986* (2013.01); *G06K 9/4652* (2013.01); *G06K 9/6284* (2013.01); *G06T 3/4046* (2013.01); *H04N 5/2353* (2013.01); *H04N 5/23212* (2013.01); *H04N 5/23229* (2013.01); *H04N 5/23296* (2013.01); *G06K 2009/366* (2013.01); *G06T 2200/21* (2013.01)

(58) Field of Classification Search
CPC ............. G06K 9/00986; G06K 9/4652; G06K 9/00288; G06K 2009/366; G06K 9/6267; G06K 9/6284; G06T 3/4046; G06T 2200/21

See application file for complete search history.

(56) References Cited

U.S. PATENT DOCUMENTS

| | | | |
|---|---|---|---|
| 7,202,873 B2 | 4/2007 | Akahori | |
| 7,308,134 B2 | 12/2007 | Wersing et al. | |
| 7,697,765 B2* | 4/2010 | Matsugu | G06K 9/4619 382/159 |
| 2002/0181765 A1* | 12/2002 | Mori | G06K 9/4628 382/158 |
| 2008/0199084 A1 | 8/2008 | Kasahara | |
| 2010/0002094 A1* | 1/2010 | Solhusvik | H04N 5/2355 348/230.1 |
| 2013/0322743 A1 | 12/2013 | Matsunaga et al. | |

FOREIGN PATENT DOCUMENTS

| | | |
|---|---|---|
| JP | 2000-339470 | 12/2000 |
| JP | 2003-274268 | 9/2003 |
| JP | 4083469 | 2/2008 |
| JP | 4083469 | 4/2008 |
| JP | 2008-204092 | 9/2008 |
| JP | 2008-234627 | 10/2008 |
| JP | 4532915 | 6/2010 |
| JP | 4532915 | 8/2010 |
| JP | 4606828 | 10/2010 |
| JP | 4606828 | 1/2011 |
| JP | 4934982 | 5/2012 |
| JP | 2013-069132 | 4/2013 |
| JP | 5256752 | 8/2013 |
| JP | 2013-250809 | 12/2013 |

OTHER PUBLICATIONS

Xiao-Xiao Niu et al: "A novel hybrid CNN SVM classifier for recognizing handwritten digits", Pattern Recognition, Elsevier, GB, vol. 45, No. 4, Sep. 29, 2011 (Sep. 29, 2011), pp. 1318-1325, XP028342391, ISSN: 0031-3203, DOI:10.1016/J.PATCOG.2011. 09.021, [retrieved on Oct. 19, 2011).
Samira Ebrahimi Kanou et al, "Combining modality specific deep neural networks for emotion recognition in video", Proceedings of the 15th ACM on International Conference on Multimodal Interaction, ICMI '13, pp. 543-550, XP055217372, New York, New York, USA DOI:10.1145/2522848.2531745, ISBN :978-1-45-032129-7.
The Extended European search report dated Oct. 13, 2015.

* cited by examiner

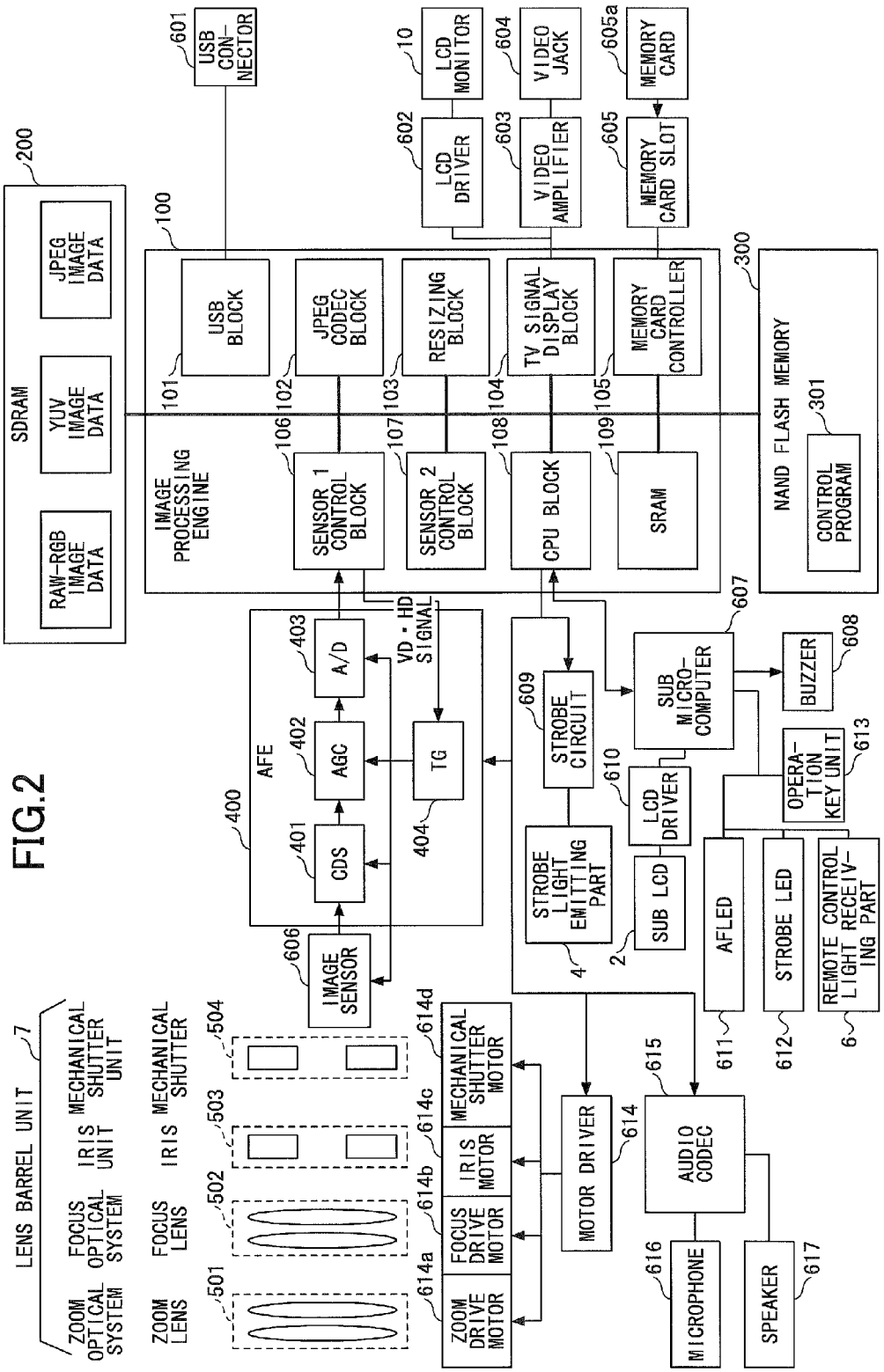

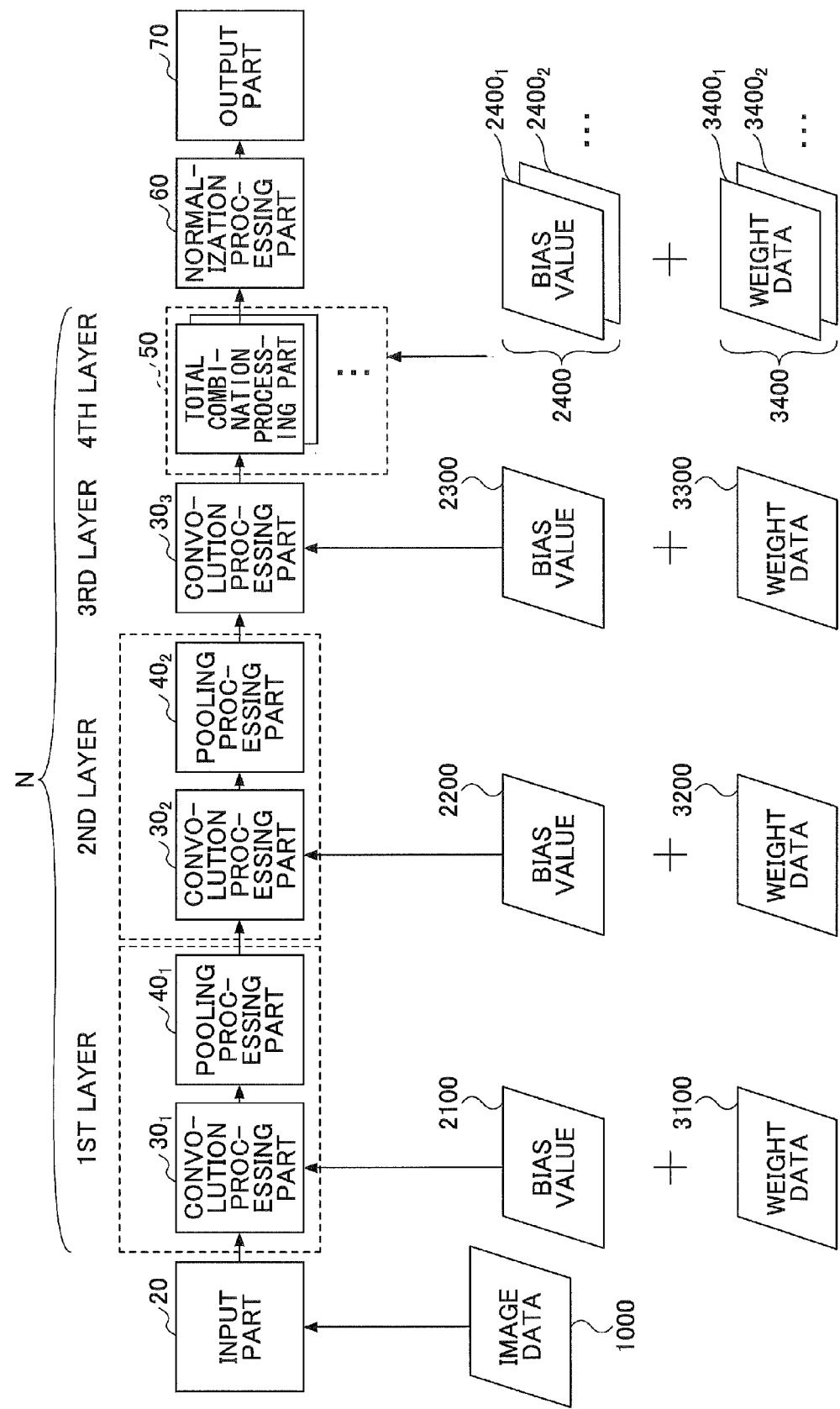

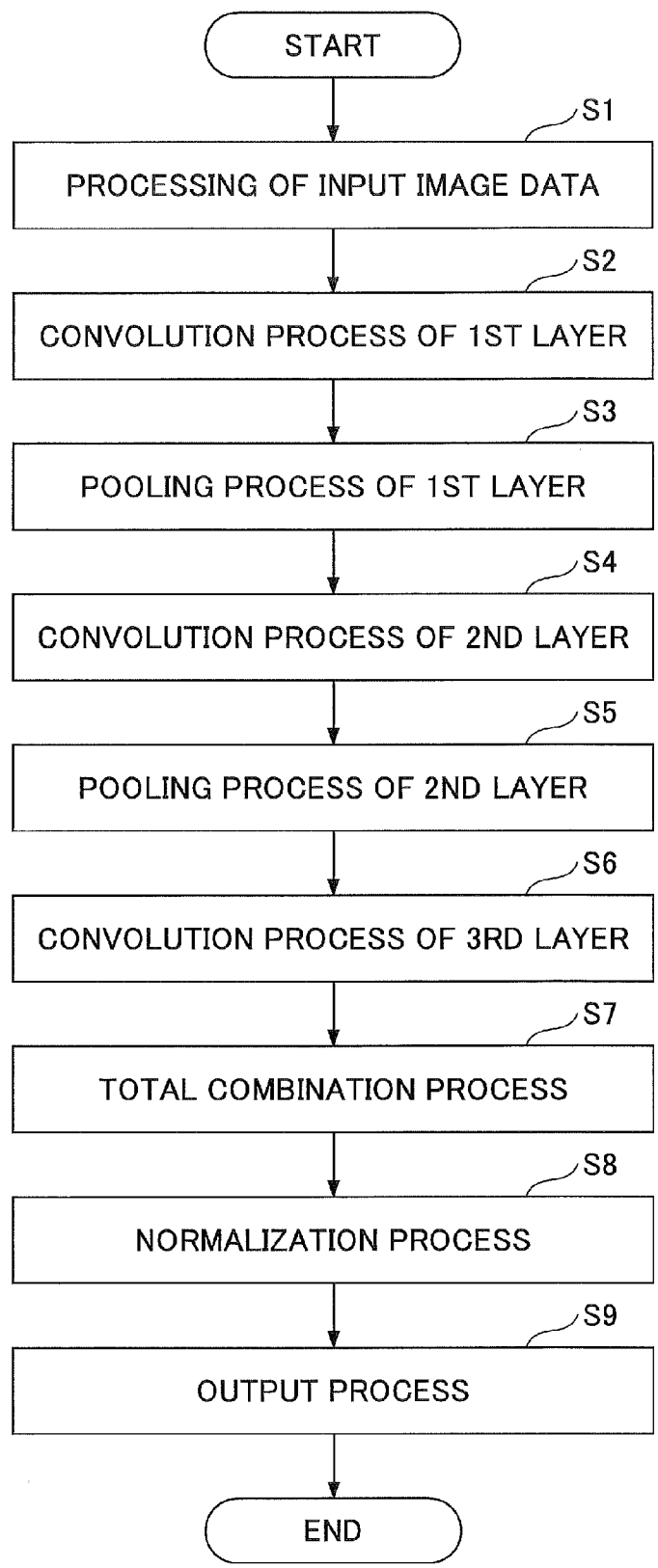

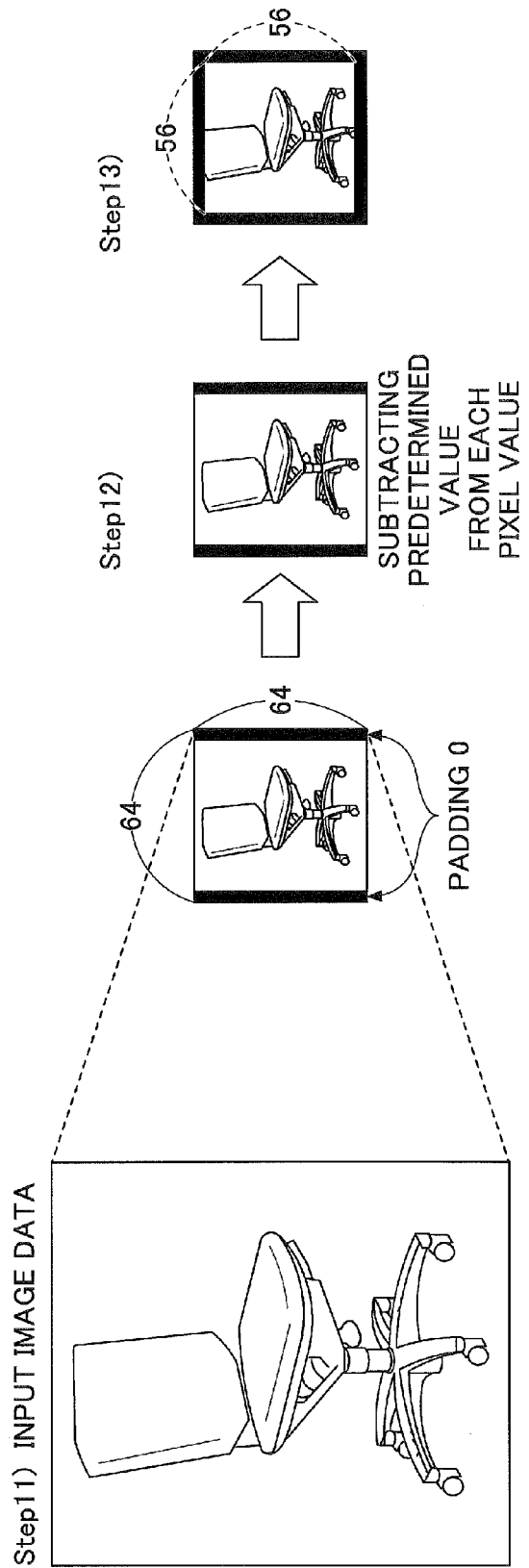

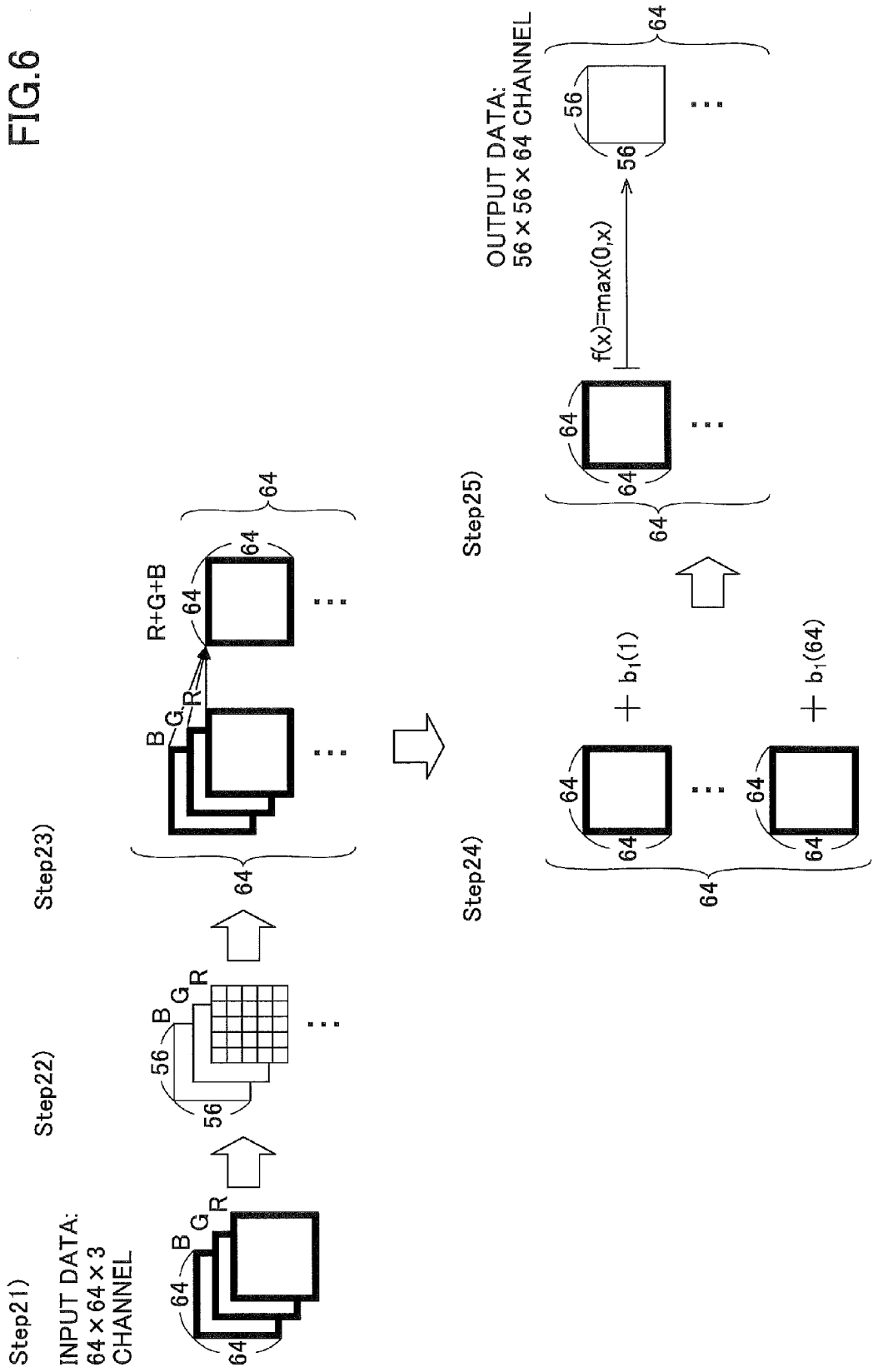

FIG.8

FILTER FOR R CHANNEL

| $w_1(1, j)$ |  | $w_1(5, j)$ |
|---|---|---|
| $w_1(6, j)$ |  | $w_1(10, j)$ |
| ⋮ | ... | ⋮ |
| $w_1(21, j)$ |  | $w_1(25, j)$ |

FILTER FOR G CHANNEL

| $w_1(26, j)$ |  | $w_1(30, j)$ |
|---|---|---|
| $w_1(31, j)$ |  | $w_1(35, j)$ |
| ⋮ | ... | ⋮ |
| $w_1(46, j)$ |  | $w_1(50, j)$ |

FILTER FOR B CHANNEL

| $w_1(51, j)$ |  | $w_1(55, j)$ |
|---|---|---|
| $w_1(56, j)$ |  | $w_1(60, j)$ |
| ⋮ | ... | ⋮ |
| $w_1(71, j)$ |  | $w_1(75, j)$ |

} FILTER $3100f_j$ ( $j=1,\cdots,64$)

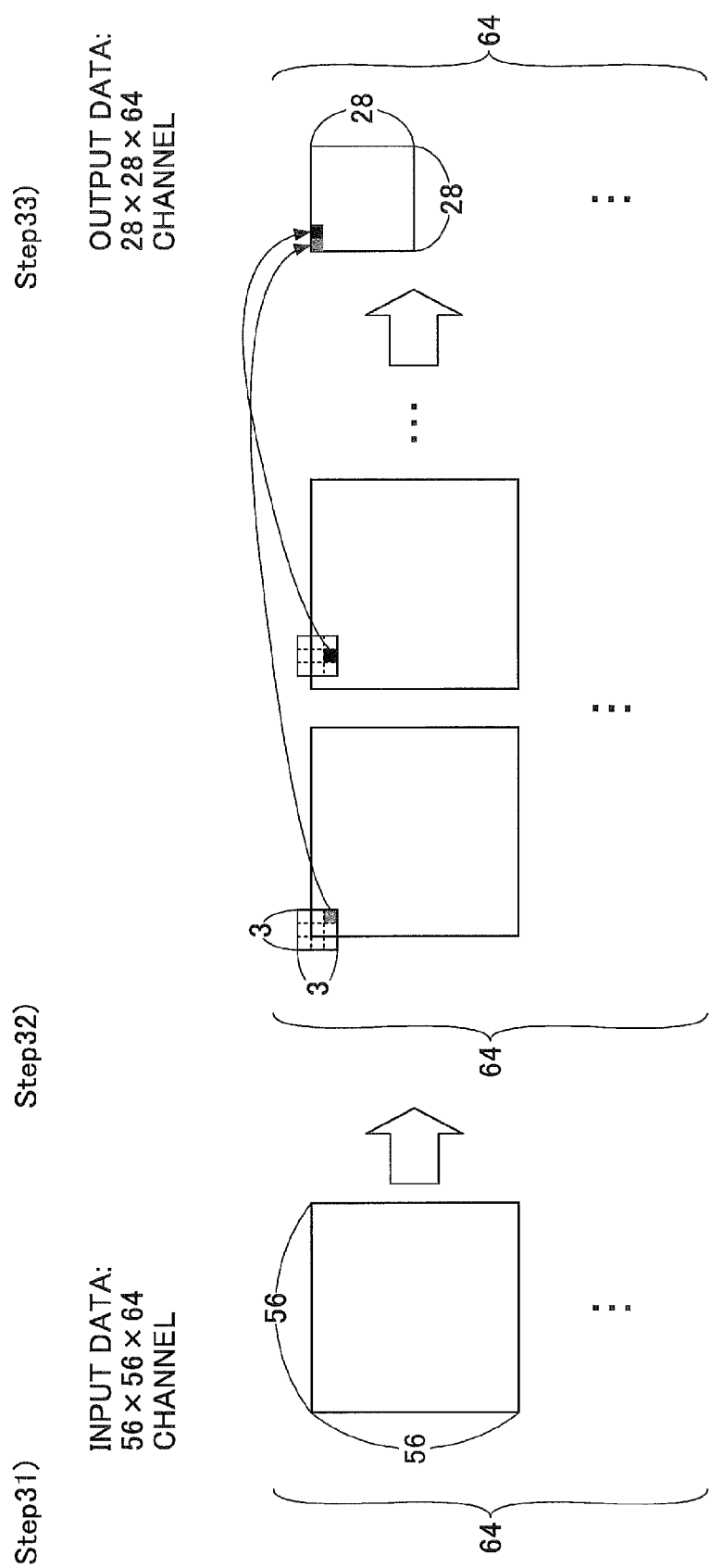

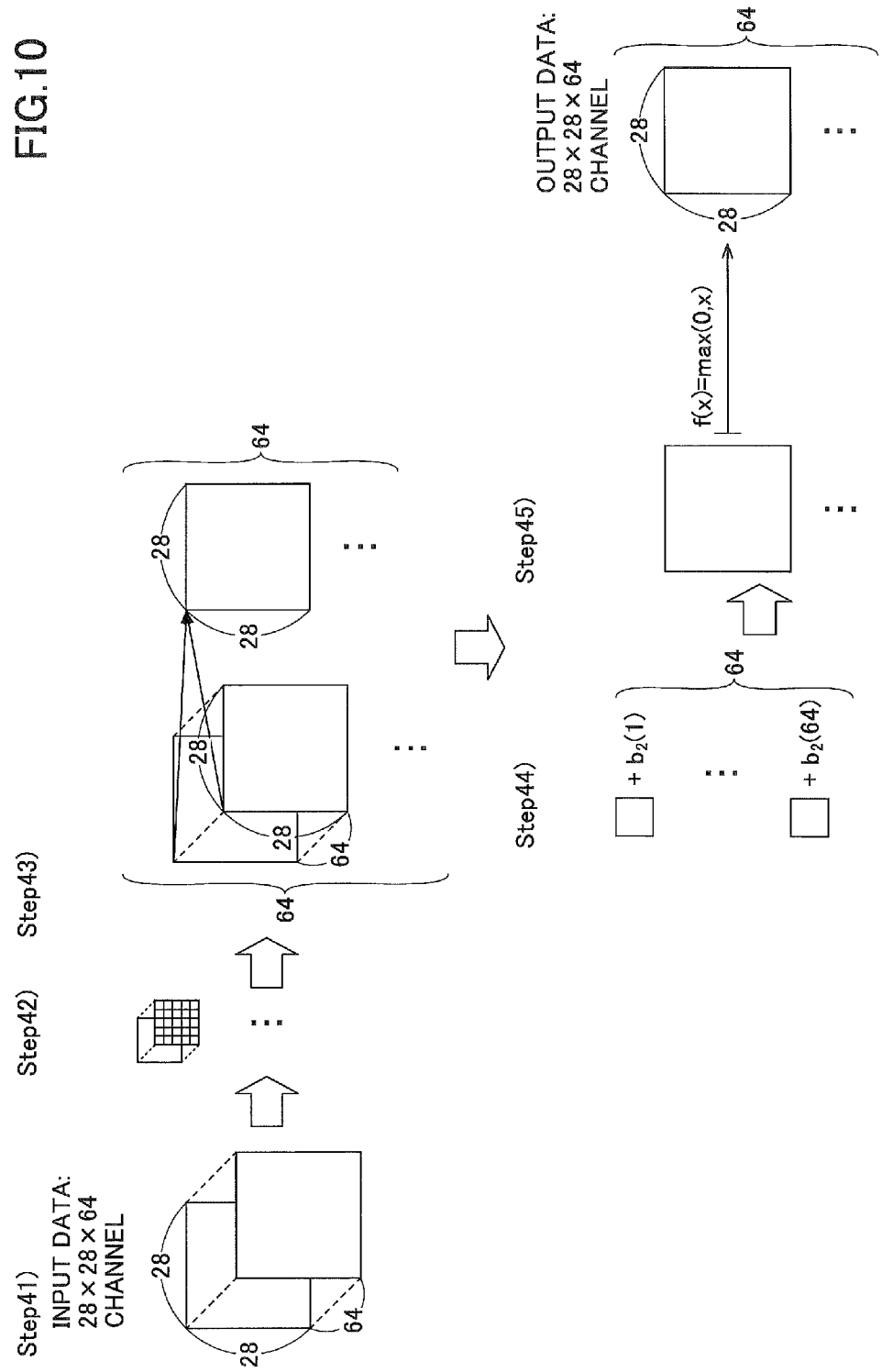

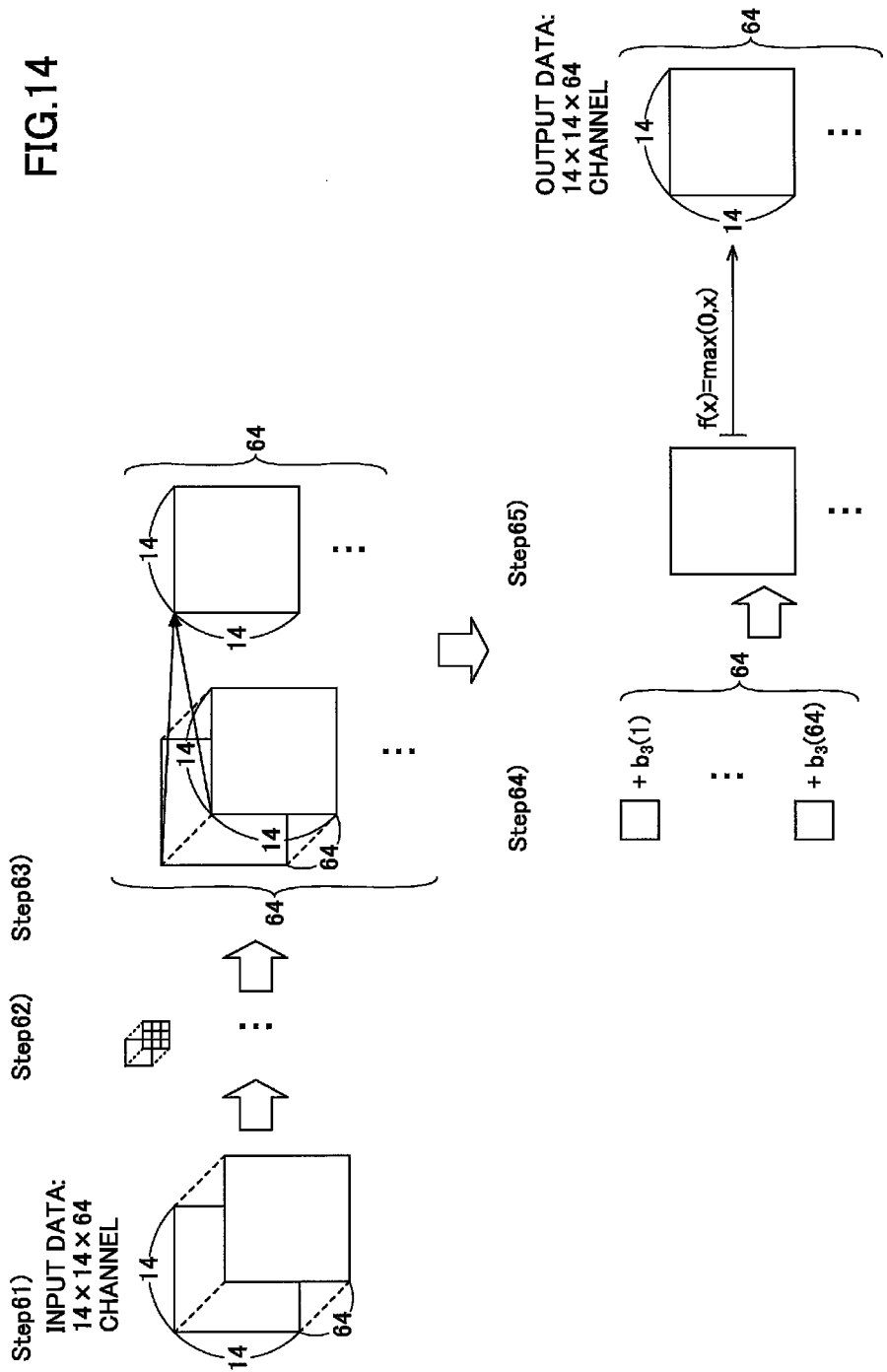

IMAGE PROCESSING APPARATUS, METHOD OF PROCESSING IMAGE, AND PROGRAM

BACKGROUND OF THE INVENTION

1. Field of the Invention

The present invention generally relates to an image processing apparatus, a method of processing an image, and a program.

2. Description of the Related Art

An exemplary image-processing technique is provided such that an apparatus such as a digital camera or a portable information terminal recognizes a scene of an image to be captured and automatically sets a white balance, an exposure, a focus point, and so on. Another exemplary image-processing technique is provided such that when a captured image is stored, an apparatus recognizes a scene of the captured image and automatically performs a process or an edit suitable for the scene.

In order to realize the above image processing, there is a technique of classifying objects on an image into genres of, for example, "human", "automobile", "dog", and "chair", using a convolution neural network as a method for the apparatus to recognize the scene (for example, Patent Documents 1 and 2). In this technique of classifying the objects on the image into the genres, there are a method of using neural networks respectively for categories (said differently, a method of using multiple neural networks) and a method of using only one network while a label is given to image data to indicate a genre to which the image data belongs.

Patent Document 1: Japanese Patent No. 4532915
Patent Document 2: Japanese Patent No. 2940933

SUMMARY OF THE INVENTION

An embodiment of the present invention is provided in consideration of the above point. An object of the embodiment is to provide a support to appropriately classify categories of image data.

One aspect of the embodiments of the present invention may be to provide an image processing apparatus that calculates to determine one category, to which an input image data belongs, among a plurality of categories, which are provided to classify a plurality of image data, including a convolution processing unit which performs a convolution process using a first coefficient used for calculating to determine the one category and previously learnt by the convolution processing unit; a plurality of total combination processing units which are prepared for each of the plurality of categories, performs a total combination process for a processing result obtained by the convolution processing unit using a second coefficient used for calculating to determine the one category and previously learnt by the total combination processing unit, and calculates to determine the one category; and a normalization unit which performs normalization of a processing result obtained by the total combination processing unit for each of the plurality of categories, wherein the convolution processing unit performs learning of the first coefficient in common with the plurality of categories, and wherein the total combination processing unit performs learning of the second coefficient for each of the plurality of categories.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 2 illustrates an exemplary structure of the image processing apparatus of the first embodiment;

FIG. 3 is a block chart illustrating an exemplary functional structure of an image processing engine of an image processing apparatus of the first embodiment;

FIG. 4 illustrates an exemplary flowchart of a category identification process in the image processing apparatus of the first embodiment;

FIG. 5 illustrates an exemplary process of processing input image data of the first embodiment;

FIG. 6 illustrates an exemplary convolution process for a 1st layer of the first embodiment;

FIG. 8 illustrates an exemplary data structure of a filter of the 1st layer of the first embodiment;

FIG. 9 illustrates an exemplary pooling process for the 1st layer of the first embodiment;

FIG. 10 illustrates an exemplary convolution process for the 2nd layer of the first embodiment;

FIG. 14 illustrates an exemplary convolution process for the 3rd layer of the first embodiment;

DETAILED DESCRIPTION OF THE PREFERRED EMBODIMENTS

A description is given below, with reference to the FIG. 1 through FIG. 34 of embodiments of the present invention. Where the same reference symbols are attached to the same parts, repeated description of the parts is omitted.

Reference symbols typically designate as follows:
1: image processing apparatus;
20: input part;
30: convolution processing part;
40: pooling part;
50: total combination processing part;
60: normalization processing part;
70: output part; and
N: convolution neural network.

[First Embodiment]
<Outer Appearance of Image Processing Apparatus>

At first, an outer appearance of an image processing apparatus 1 of the first embodiment is described.

Figure 1A:
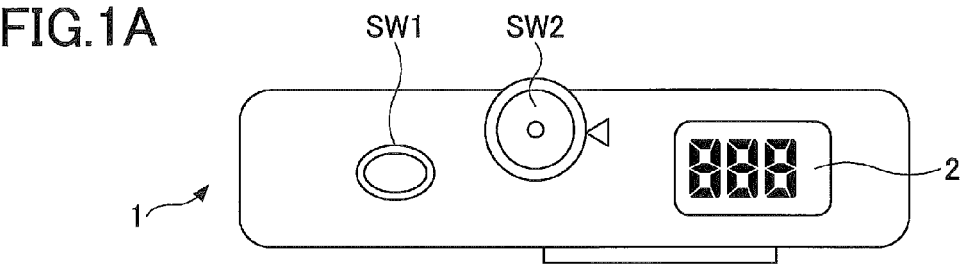
FIGS. 1A, 1B, and 1C illustrate exemplary outer appearances of an image processing apparatus of a first embodiment.
Figure 1B:
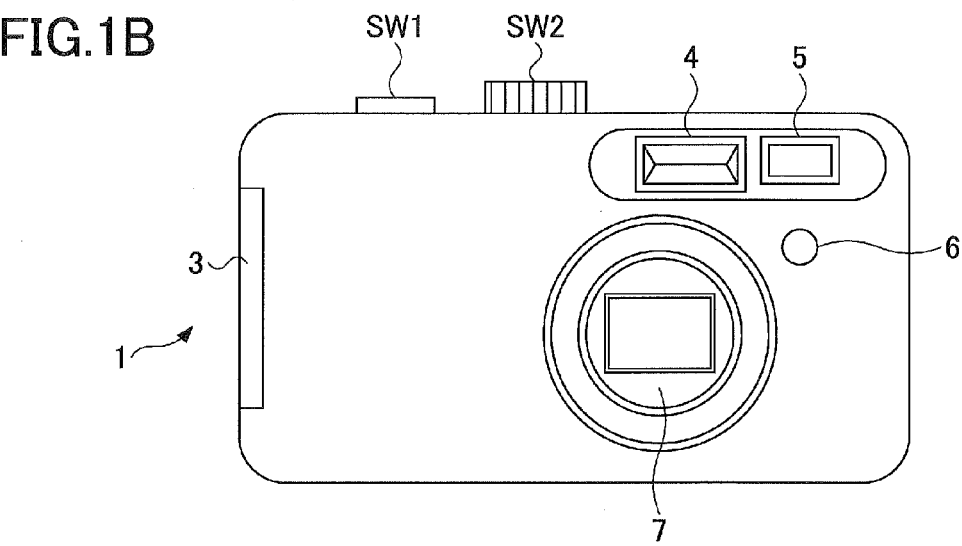
Figure 1C:
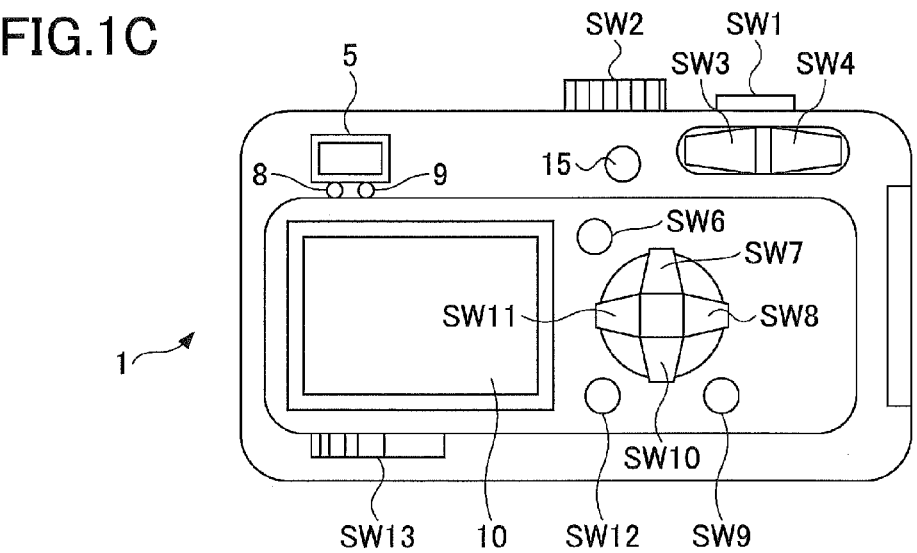

FIGS. 1A, 1B, and 1C illustrate an exemplary structure of the image processing apparatus of the first embodiment. Referring to FIGS. 1A, 1B, and 1C, an outer appearance of a digital camera as an example of the image processing apparatus is illustrated. FIG. 1A is a plan view, FIG. 1B is a front view, and FIG. 1C is a back view. The image processing apparatus 1 is not limited to a digital camera and may be an apparatus which can perform image processing such as a mobile phone, a smartphone, a tablet terminal, a game machine, or the like.

A release shutter SW1, a mode dial SW2, and a sub LCD 2 are provided on an upper surface of the digital camera. The strobe light emitting part 4, an optical finder 5, a remote control light receiving part 6, and a lens barrel unit 7 are provided on a front surface of the digital camera. An SD card and battery cover 3 is provided on a left side surface when viewed from the front surface.

An AFLED 8, a strobe LED 9, a zoom switch (wide) SW3, a zoom switch (tele) SW4, a self timer/deletion switch SE5, a menu switch SW6, and an up/strobe switch SW7 are provided on a back surface of the digital camera. Further, a right switch SW8, a display switch SW9, a down/strobe switch SW10, a left/image check switch SW11, an OK switch SW12, a LCD monitor 10, and a power switch SW13 are provided on the back surface of the digital camera.

<Inner Structure of Image Processing Apparatus>

Described next is an inner structure of the image processing apparatus 1. FIG. 2 illustrates an exemplary structure of the image processing apparatus of the first embodiment. Referring to FIG. 2, the lens barrel unit 7 includes a zoom optical system which includes a zoom lens 501 for taking in an optical image of a photographic object and a zoom drive motor 614, a focus optical system including a focus lens 502 and a focus drive motor 614b, an iris unit including an iris 53 and an iris motor 614c, a mechanical shutter unit including a mechanical shutter 504 and a mechanical shutter motor 614d, and a motor driver 614 driving the above motors. The motor driver 614 is controlled to be driven by a drive instruction from a CPU block 108 provided inside the image processing engine 100 based on input information received by the remote control light receiving part 6 or an operation input to an operation key unit 613.

A NAND flash memory 300 connected to the image processing engine 100 stores a control program 301 described using a code decodable by the CPU block 108, a control parameter used by the control program 301, or the like. When the power of the image processing apparatus 1 is turned on, the control program 301 is loaded onto an SRAM 109, and the CPU block 108 controls operations of various portions of the image processing apparatus 1 using the control program loaded onto the SRAM 109. Further, the control program 301 temporarily stores data necessary for the control in the SRAM 109, an SDRAM 200, or the like. Because the NAND flash memory 300 is a rewritable non-volatile memory, the control program 301, the control parameter used by the control program 301, and so on can be changed. For example, it is possible to perform a version upgrade or the like.

An image sensor 606 is a solid-state image sensing device for providing an optical image with a photoelectric conversion. An analog front end (AFE) 400 includes a CDS 401 for performing a correlated double sampling for image noise reduction, an AGS 402 for performing a gain adjustment, an A/D 403 for performing a digital signal conversion, and a TG 404. The TG 404 is supplied with a vertical synchronization signal (a VD signal) and a horizontal synchronization signal (a HD signal) from the sensor 1 control block 106 and generates a drive timing signal for the image sensor 606 and the AFE 400.

The image processing engine 100 provides a white balance setup and a gamma setup to output data sent from the image sensor 606 to the AFE 400. The image processing engine 100 includes the above sensor 1 control block 106 for supplying the VD signal and the HD signal, a sensor 2 control block 107 for converting to brightness data and color difference data by a filtering process, and the above CPU block 108 for controlling operations of various portions of the image processing apparatus 1.

Further, the image processing engine 100 includes the above SRAM 109 that temporarily stores the data necessary for the control, a USB block 101 performing a USB communication with an external apparatus such as a personal computer, and a JPEG CODEC block 102 performing a JPEG compression and decompression.

Further, the image processing engine 100 includes a resizing block 103 for enlarging or reducing the size of the image data using an interpolation process, a TV signal display block 104 for converting the image data to a video signal for causing the image data to be displayed on an external display apparatus such as a liquid crystal monitor or a television set, and a memory card controller block 105 for controlling a memory card which records captured image data.

The SDRAM 200 temporarily stores image data before providing various processes to the image data using the above image processing engine 100. The image data to be stored is taken in from the image sensor 606 through the AFE 400, for example. Here, the taken image data are "RAW-RGB image data" provided with the white balance setup or the gamma setup by the sensor 1 control block by the sensor 1 control block 106, "YUV image data" provided with the conversion to the brightness data or the color difference data by the sensor 2 control block 107, "JPEG image data" provided with the JPEG compression by the JPEG CODEC block 102, and so on.

The memory card slot 605 is connected to the memory card controller 105. An attachable and detachable memory card 605a is installed into this memory card slot 605. In a case where the memory card 605a is installed into the memory card slot 605, a built-in memory (not illustrated) for storing the captured image data may be connected to the image processing engine 100.

The LCD driver 602 is provided to drive the LCD monitor 10 and has a function of converting the video signal output from the TV signal display block 104 to a signal for displaying the video signal on the LCD monitor 10. The LCD monitor 10 is used to monitor a photographic object before capturing the image, check the captured image, and display the image data stored in the memory card 605a or the above built-in memory (not illustrated). The video amplifier 603 is provided to convert the impedance of the video signal output from the TV signal display block 104 to 75Ω. A video jack 604 is provided to connect to the external display apparatus such as the television set.

A USB connector 601 is provided to perform a USB connection with the external apparatus such as a personal computer.

A sub microcomputer 607 is formed by one chip, in which a CPU, a ROM, and a RAM are provided. The sub microcomputer 607 outputs an output signal output from the operation key unit 613 or the remote control light receiving part 6 to the CPU block 108 as operation information of a user or converts a state of a camera output from the CPU block 108 to a control signal for the sub LCD 2, an AFLED 611, a strobe LED 612, and a buzzer 608 and outputs the same.

The sub LCD 2 is a display part for displaying the number of pictures possible or the like. The LCD driver 610 is a drive circuit for driving the sub LCD 2 using the output signal from the sub microcomputer 607.

The AFLED 611 is an LED for displaying a focusing state at a time of capturing the image. The strobe LED 612 is an LED for displaying a strobe charging state. The AFLED 611 and the strobe LED 612 may be used for another display use such as an indication of access to the memory card access. The operation key unit 613 is a key circuit operated by the user. The remote control light receiving part 6 is a receiving part for receiving a signal sent from a remote control transmitter operated by the user.

A strobe circuit 609 for controlling the strobe light emitting part 4 to emit strobe is connected to the image processing engine 100. An audio CODEC 615, which is controlled by the CPU block 108 and includes a built-in audio amplifier for driving a microphone amplifier amplifying an input audio signal and a speaker, is connected to the image processing engine 100. Further, a microphone 616 through which the user inputs the audio signal and a speaker 617 which outputs the audio signal are connected to the audio CODEC 615.

<Functional Structure of Image Processing Engine of Image Processing Apparatus>

Next, a functional structure of the image processing engine 100 of the image processing apparatus 1 of the first embodiment is described. FIG. 3 is a block chart illustrating an exemplary functional structure of the image processing engine of the image processing apparatus of the first embodiment. Within the first embodiment, a convolution neural network N is used to calculate a certainty factor indicative of a degree of classifying the input image data into one genre among multiple genres, and the convolution neural network N is formed by a first, second, third, and 4th layers (1st, 2nd, 3rd, 4th layers), for example. Said differently, the convolution neural network N of the first embodiment is formed by the 1st and 2nd layers for performing a convolution process and a pooling process, the 3rd layer for performing the convolution process, and the 4th layer for performing a total combination process. The structure of the convolution neural network N is not limited thereto, and may be formed by the 1st layer to a (n−2)-th layer for performing the convolution process and the pooling process, the (n−1)-th layer for performing the convolution process, and the n-th layer for performing the total combination process.

In the first embodiment, a category is defined as a pair of a case where the image data is classified into one genre and a case where the image data is classified into other than the one genre. One example of the categories is "cuisine" and "other than cuisine". In a manner similar thereto, the other exemplary categories are "flower" and "other than flower", "automobile" and "other than automobile", "autumn leaves" and "other than autumn leaves", or the like.

Referring to FIG. 3, the image data 1000 is input into the input part 20. The input part 20 provides a predetermined processing process to the input image data 1000 and outputs the image data to a convolution processing part $30_1$ of the 1st layer.

After the convolution processing part $30_1$ of the 1st layer provides the image data with the convolution process based on a bias value 2100 and a weight data 3100, which are previously learnt using the convolution neural network N of the first embodiment, the image data is output to a pooling processing part $40_1$ of the 1st layer. After the pooling processing part $40_1$ of the 1st layer provides the image data with the pooling process, the image data is output to the convolution processing part $30_2$ of the 2nd layer.

After the convolution processing part $30_2$ of the 2nd layer provides the image data with the convolution process based on a bias value 2200 and a weight data 3200, which are previously learnt using the convolution neural network N of the first embodiment, the image data is output to a pooling processing part $40_2$ of the 2nd layer. After the pooling processing part $40_2$ of the 2nd layer provides the image data with the pooling process, the image data is output to the convolution processing part $30_3$ of the 3rd layer.

After the convolution processing part $30_3$ of the 3rd layer provides the image data with the convolution process based on a bias value 2300 and a weight data 3300, which are previously learnt using the convolution neural network N of the first embodiment, the image data is output to a total combination processing part 50 of the 4th layer.

After the total combination processing part 40 of the 4th layer provides the image data with the total combination process based on a bias value 2400 and a weight data 3400, which are previously learnt using the convolution neural network N of the first embodiment, the image data is output to a normalization processing part 50 of the 4th layer. Here, the total combination processing part 50 of the convolution neural network N of the first embodiment is provided for each category. For example, in a case where the number of the categories, namely, "cuisine" and "other than cuisine", "flower" and "other than flower", and "automobile" and "other than automobile", is three, three total combination processing parts $50_1$ to $50_3$ are respectively provided for the three categories. Therefore, if the number of the categories increases or decreases, the corresponding total combination processing part 50 is added or deleted. Meanwhile, if the number of the categories increases or decreases, the convolution processing part 30 and the pooling processing part 40 are not added or deleted.

The bias value 2400 and the weight data 3400 are provided for each total combination processing part 50. For example, in a case where there are three categories of "cuisine" and "other than cuisine", "flower" and "other than flower", and "automobile" and "other than automobile", the bias value $2400_1$ and the weight data $3400_1$ used by the total combination processing part $50_1$ corresponding to the category of "cuisine" and "other than cuisine", the bias value $2400_2$ and the weight data $3400_2$ used by the total combination processing part $50_2$ corresponding to the category of "flower" and "other than flower", and the bias value $2400_3$ and the weight data $3400_3$ used by the total combination processing part $50_3$ corresponding to the category of "automobile" and "other than automobile" exist.

Thus, the bias value 2400 and the weight data 3400 are values (data) previously learnt for each category by the convolution neural network N. Meanwhile, the bias values 2100 to 2300 and the weight data 3100 to 3300 are values (data) previously learnt by the convolution neural network N. These bias values 2100 to 2400 and weight data 3100 to 3400 are called a network coefficient or a network combination coefficient of the convolution neural network N, and an example of a coefficient in claims.

The normalization processing part 60 provides a predetermined normalization process to results obtained by processing each total combination processing part 50. Then, the output part 70 outputs a processing result obtained by the normalization processing part 60.

Within the first embodiment, the bias values 2100 to 2400 and the weight data 3100 to 3400 are the values (data) previously learnt by the convolution neural network N as described above. These bias values 2100 to 2400 and these weight data 3100 to 3400 are stored in a NAND flash memory 300 or the like. The data structures of the bias values 2100 to 2400 and the weight data 3100 to 3400 are described later.

The NAND flash memory 300 or the like may store learning data used in the above learning. The learning data is used to update the bias values 2100 to 2400 and the weight data 3100 to 3400 by the convolution neural network N. The learning data includes the image data used for the learning and a teacher (data correct answer label) indicating that the image data belongs to which category (a genre).

The image processing engine can perform various processes described later by the above structures.

<Detailed Process>

Referring to FIGS. 4 to 19, described in detail is a process of the image processing apparatus 1 of the first embodiment.

FIG. 4 illustrates an exemplary flowchart of a category identification process in the image processing apparatus of the first embodiment. The image processing apparatus 1 of the first embodiment can calculate (identify) one of the predetermined categories to which the input image data belongs.

In step S1, the input part 20 inputs (receives) an image data 1000 and performs a processing process for inputting the image data 1000 into the convolution neural network N. Referring to FIG. 5, this processing process is described. FIG. 5 illustrates an exemplary processing process of processing the input image data of the first embodiment. The color space of the image data 1000 is a RGB color space. Said differently, the number of color channels of the image data 1000 is three channels. However, the color space of the image data 1000 is not limited to the RGB color space and may be, for example, a CMK color space, a HSV color space, a HLS color space, or the like.

In step 11, the input part 20 reduces the size of the input image data 1000 to be an image data of 64×64 (pixels). At this time, the image data is reduced so that the long side of the image data 1000 has 64 (pixels). If the short side becomes smaller than 64 (pixels), an area smaller than 64 (pixels) in the direction of the short side as the result of the reduction is provided with a padding using a value 0 (color elements of RGB are 0) so as to have the short side of 64 (pixels). An algorithm for reducing the image data 1000 is, for example, a bilinear method.

In step 12, the input part 20 generates an image data by subtracting a predetermined value from each pixel value of the image data of 64×64 obtained in the above step 11. Here, the predetermined value is an average value of the pixel values of the image data (hereinafter, referred to as a "learning image data") contained in each learning data. Said differently, in a case where an average value of the pixel values at a pixel position (i,j) of each learning image data is represented by M(i,j), M(i,j) is subtracted from the pixel values at each pixel position (i,j) of the image data of 64×64 obtained in the above step 11. In this, i and j are in a range of 1, . . . , 64 (i, j=1, . . . , 64).

Finally, in step 13, the input part 20 clears the pixel values of the image data obtained in step 12 other than those of a center area of 56×56 (pixels) to zero. Said differently, the input part 20 clears the pixel values of the image data obtained in step 12 in a peripheral 4 pixels to zero. Referring to FIG. 5, a shaded portion is where the pixel values of the image data are cleared to zero.

The input part 20 outputs the image data 110 obtained in the above step S13 (see FIG. 5) to the convolution processing part $30_1$ of the first layer.

Referring to FIG. 4, the convolution processing part $30_1$ of the first layer inputs (receives) the image data 1100 and provides the image data 1100 with the convolution process. Referring to FIG. 6, the convolution process of the 1st layer is explained. FIG. 6 illustrates an exemplary convolution process for the 1st layer of the first embodiment.

In step S21, the convolution processing part $30_1$ inputs the input image data. Because the color space of the input image data 1100 is the RGB color space, the color channel is 64×64×3 channels.

In step 22, the convolution processing part $30_1$ generates a filter from the weight data 3100 and provides a filter process to a center portion of 56×56 of the image data 1100 using the generated filter. Here, explained below are a data structure of the weight data 3100 and a data structure of a filter 3100f generated using the weighted data 3100.

Figure 7A:
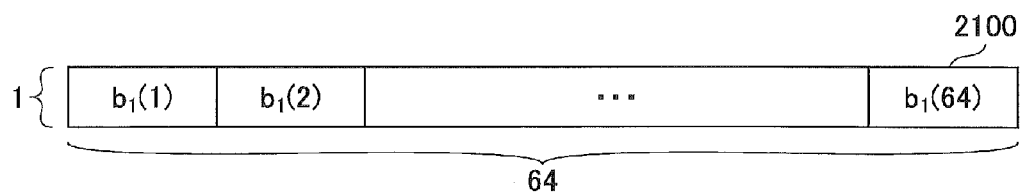
FIGS. 7A and 7B illustrate exemplary data structures of a bias value and a weighted data of the 1st layer of the first embodiment.
Figure 7B:
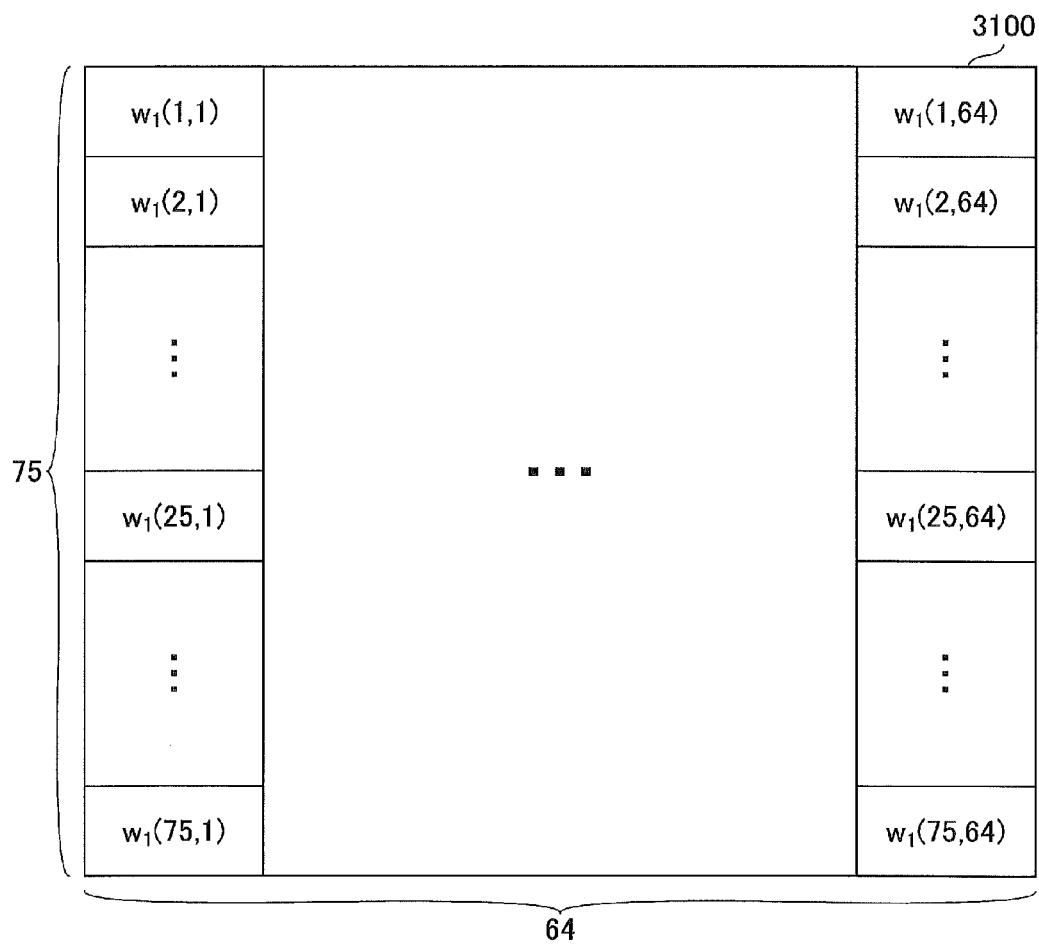

FIG. 7B illustrates an exemplary data structure of the weight data 3100 of the 1st layer. Referring to FIG. 7B, the weight data 3100 of the 1st layer has a data structure represented by a matrix of 75×64. Each value $w_1(i,j)$ of the weight data 3100 is previously learnt by the convolution neural network N as described above.

Next, the data structure of the filter 3100 generated from the weight data 3100 is described. FIG. 8 illustrates an exemplary data structure of the filter of the 1st layer of the first embodiment. Referring to FIG. 8, the filters 3100f have a data structure represented by three sets of 5×5 matrices. Said differently, each of the filters 3100f has a data structure represented by 5×5×3. For example, the filter $3100f_1$ is generated from $w_1(1,1)$ to $w_1(25,1)$, $w_1(26,1)$ to $w_1(50,1)$, and $w_1(51,1)$ to $w_1(75,1)$. In a manner similar thereto, a filter $3100f_2$ is generated from $w_1(1,2)$ to $w_1(25,2)$, $w_1(26,2)$ to $w_1(50,2)$, and $w_1(51,2)$ to $w_1(75,2)$. Cases where j=3, . . . , 64 are similar to the above.

The convolution processing part $30_1$ provides a filtering process using the filters 3100f generated as described above. For example, the filtering process is performed as described below.

(1) The filter 3100f1 is provided to a center portion of 56×56×3 of the image data 1100 (Said differently, values of the filter $3100f_1$ are multiplied with the center portion corresponding to the filter $3100f_1$). For example, the R channel is fixed and the center of the filter $3100f_1$ for the R channel is shifted right by 5 from the upper left of 56×56. When the center of the filter $3100f_1$ for the R channel reaches the right end of the portion of 56×56, the center of the filter $3100f_1$ is shifted downward by 5, and the filter $3100f_1$ for the R channel is applied again from the left end to the portion of 56×56.

(2) Next, the filter $3100f_1$ for the G channel is provided to the G channel of the image data in a manner similar to the above (1). The filter $3100f_1$ for the B channel is provided to the B channel of the image data in a manner similar to the above (1).

(3) The filters $3100f_2$ to $3100f_{64}$ are provided to each of the RGB channels of the image data 1100 in a manner similar to the above (1).

As described, an image of 64×64×3×64 is generated from the image data 1100 using the above filtering process.

In step 23, the convolution processing part $30_1$ adds the RGB elements of the image data of 64×64×3×64 channels obtained in the above step 22. As a result, the image data of 64×64×64 channels is obtainable.

In step 24, the convolution processing part $30_1$ adds the bias value 2100 to each pixel value of the image data obtained in step 23. FIG. 7A illustrates an exemplary data structure of the bias value 2100 of the 1st layer. As illustrated in FIG. 7A, the bias value 2100 is represented by a matrix of 1×64. The convolution processing part $30_1$ adds the bias value $b_1(1)$ to each pixel value of a first image data. In a manner similar thereto, a bias value $b_1(2)$ is added to each pixel value of a second image data. In a manner similar thereto, the bias value 2100 is added to each pixel value of all 64 image data.

In step 25, the convolution processing part applies a predetermined activating function to the image data of 64×64×64 channels obtained in step 24 so as to obtain output image data. The predetermined activating function is, for example, a function defined by f(x)=max(0,x), where x represents an arbitrary pixel value.

In the above step 25, after applying the activating function to the image data of 64×64×64 channels, the shaded portion cleared to 0 in the above process is removed. Only the central portion of 56×56 of the image data is output to the pooling processing part $30_1$. Accordingly, the color channel of the image data output by the convolution processing part $30_1$ to the pooling processing part $40_1$ is 56×56×64. Hereinafter, the image data of 56×56×64 channels obtained as described above is referred to as an "image data 1200". The shaded portion may be removed in step 23 or 24.

In step S3, the pooling processing part $40_1$ inputs the image data 1200, and the pooling process is provided to the image data 1200. Referring to FIG. 9, the pooling process of the 1st layer is explained. FIG. 9 illustrates an exemplary pooling process for the 1st layer of the first embodiment.

In step 31, the pooling processing part 401 inputs the image data 1200 of 56×56×64 channels.

In step 32, the pooling processing part $40_1$ repeatedly performs processes of outputting the maximum value in an area of 3×3 on the image data 1200 so as to generate an image data (hereinafter, referred to as an "image data 1300") of 28×28×64. For example, the pooling process is performed as described below.

(1) The maximum value in the area of 3×3 counted from the upper left as the center on a single image data 56×56 of the image data 1200 is obtained. This maximum value is set to be a pixel value of the image data 1300 at a pixel position (1,1).

(2) Next, the area of 3×3 is moved right by every 2 while obtaining the maximum values of the pixel values in every area. The obtained maximum values are pixel values at pixel positions (1,2) to (1,28) of the image data 1300.

(3) Next, the area of 3×3 is moved down by 2 and every 2 from the left end while obtaining the maximum values of the pixel values in every area. The obtained maximum values are pixel values at pixel positions (2,1) to (2,28) of the image data 1300. Thereafter, pixel values of (3,1) to (28,28) are obtainable in a manner similar thereto.

(4) The above (1), (2), and (3) are performed for all image data of 56×56. Said differently, the above (1), (2), and (3) are performed for 64 image data of 56×56.

In step 33, the pooling processing part $40_1$ outputs the image data 1300 to the convolution processing part $30_2$ of the second layer.

In step S4 of FIG. 4, the convolution processing part 302 of the 2nd layer inputs (receives) the image data 1300 and provides the image data 1300 with the convolution process. Referring to FIG. 10, the convolution process of the 2nd layer is explained. FIG. 10 illustrates an exemplary convolution process for the 2nd layer of the first embodiment.

In step S41, the convolution processing part 302 inputs the input image data 1300. The color channel of the input image data 1300 is 28×28×64 channels.

In step 42, the convolution processing part $30_2$ generates a filter from the weight data 3200 and provides a filter process to the image data 1300 using the generated filter. Here, explained below are a data structure of the weight data 3200 and a data structure of a filter 3100f generated using the weighted data 3200.

Figure 11A:
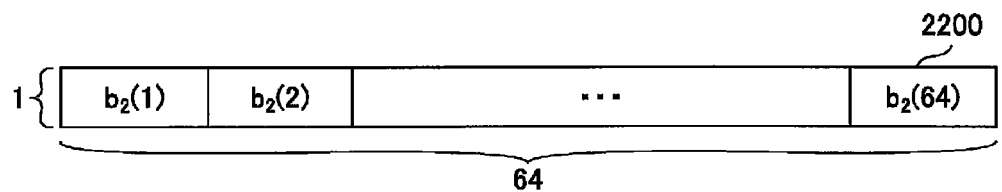
FIGS. 11A and 11B illustrate exemplary data structures of a bias value and a weighted data of a 2nd layer of the first embodiment.
Figure 11B:
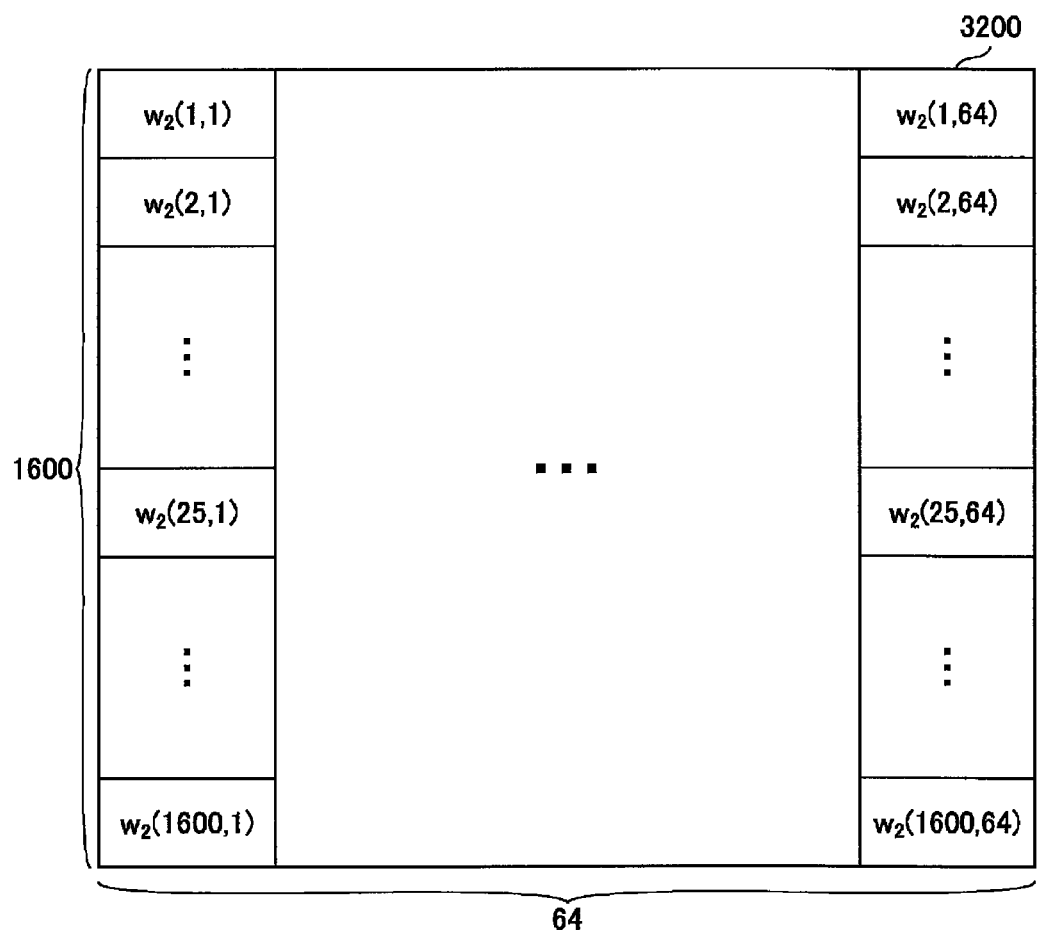

FIG. 11B illustrates an exemplary data structure of the weight data 3200 of the 2nd layer. Referring to FIG. 11B, the weight data 3200 of the 2nd layer has a data structure represented by a matrix of 1600×64. Each value $w_2(i,j)$ of the weight data 3200 is previously learnt by the convolution neural network N as described above.

Figure 12:
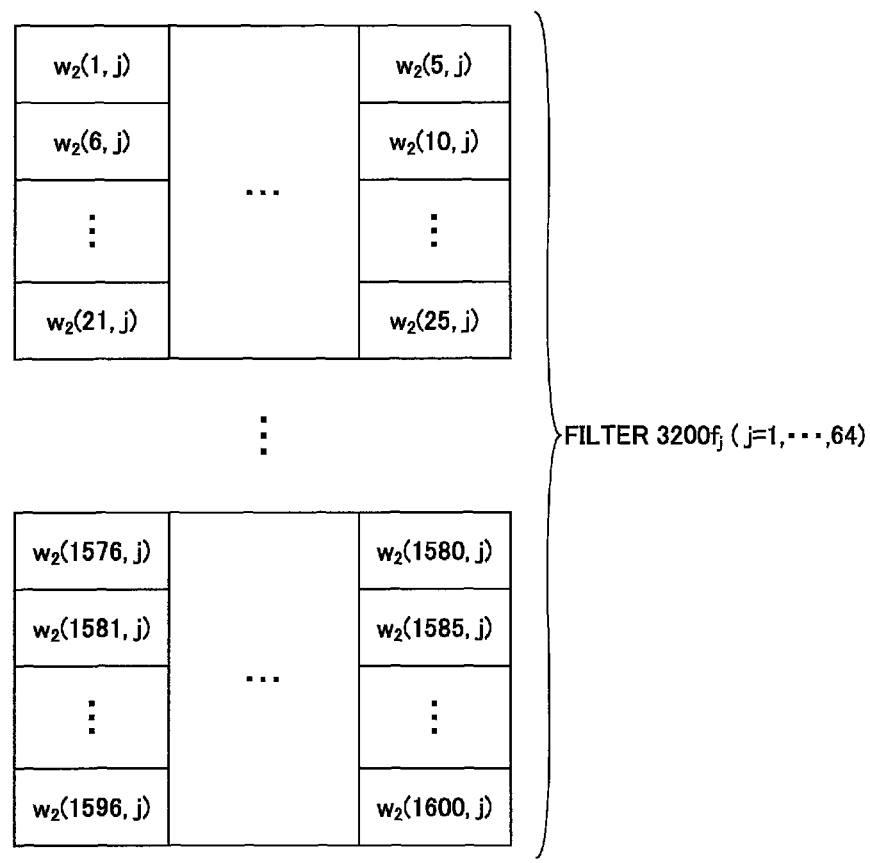
FIG. 12 illustrates an exemplary data structure of a filter of the 2nd layer of the first embodiment.

Next, the data structure of the filter 3200f generated from the weight data 3200 is described. FIG. 12 illustrates an exemplary data structure of the filter of the 2nd layer of the first embodiment. Referring to FIG. 12, the filters 3200f have a data structure represented by 64 sets of 5×5 matrices. Said differently, each of the filters $3200f$ has a data structure represented by 5×5×64. For example, the filter $3200f_1$ is generated from $w_2(1,1)$ to $w_2(25,1)$, . . . $w_2(1576,1)$ to $w_2(1600,1)$. In a manner similar thereto, the filter $3200f_2$ is generated from $w_2(1,2)$ to $w_2(25,2)$, . . . $w_2(1576,2)$ to $w_2(1600,2)$. Cases where j=3, . . . , 64 are similar to the above.

The convolution processing part 302 provides a filtering process using the filters $3200f$ generated as described above. For example, the filtering process is performed as described below.

(1) The filter $3200f_1$ is provided to the image data 1300 (Said differently, values of the filter $3200f_1$ are multiplied with the image data). For example, a single channel is fixed and the center of the filter $3200f_1$ is shifted right by 5 from the upper left of 28×28. When the center of the filter $3200f_1$ reaches the right end of the portion of 28×28, the center of the filter $3200f_1$ is shifted downward by 5, and the filter $3200f_1$ is applied again from the left end to the portion of 28×28.

(2) Next, the filter $3200f_1$ is applied to another channel of the image data 1300 using a method similar to the above (1). This process is repeatedly applied to all channels 1 to 64.

(3) The filters $3200f_2$ to $3200f_{64}$ are sequentially provided to all the channels of the image data 1300 in a manner similar to the above.

As described, an image of 28×28×64×64 is generated from the image data 1300 using the above filtering process.

Next, in step 43, the convolution processing part $30_2$ adds the pixel values of the image data obtained in step 42 for the portion of 28×28. As a result, the image data of 28×28×64 channels is obtainable.

In step 44, the convolution processing part $30_2$ adds the bias value 2200 to each pixel value of the image data obtained in step 43. FIG. 11A illustrates an exemplary data structure of the bias value 2200 of the 2nd layer. As illustrated in FIG. 11A, the bias value 2200 is represented by a matrix of 1×64. The convolution processing part $30_2$ adds the bias value $b_2(1)$ to each pixel value of a first image data. In a manner similar thereto, a bias value $b_2(2)$ is added to each pixel value of a second image data. In a manner similar thereto, the bias value 2200 is added to each pixel value of all 64 image data.

Subsequently, in step 45, the convolution processing part $30_2$ applies a predetermined activating function to the image data of 28×28×64 channels obtained in step 44 so as to obtain output image data. The predetermined activating function is, for example, a function defined by $f(x)=\max(0, x)$, where x represents an arbitrary pixel value. Hereinafter, the image data of 28×28×64 channels obtained as described above is referred to as an "image data 1400". The convolution processing part $30_2$ outputs the image data 1400 to the pooling processing part $30_2$ of the 2nd layer.

Figure 13:
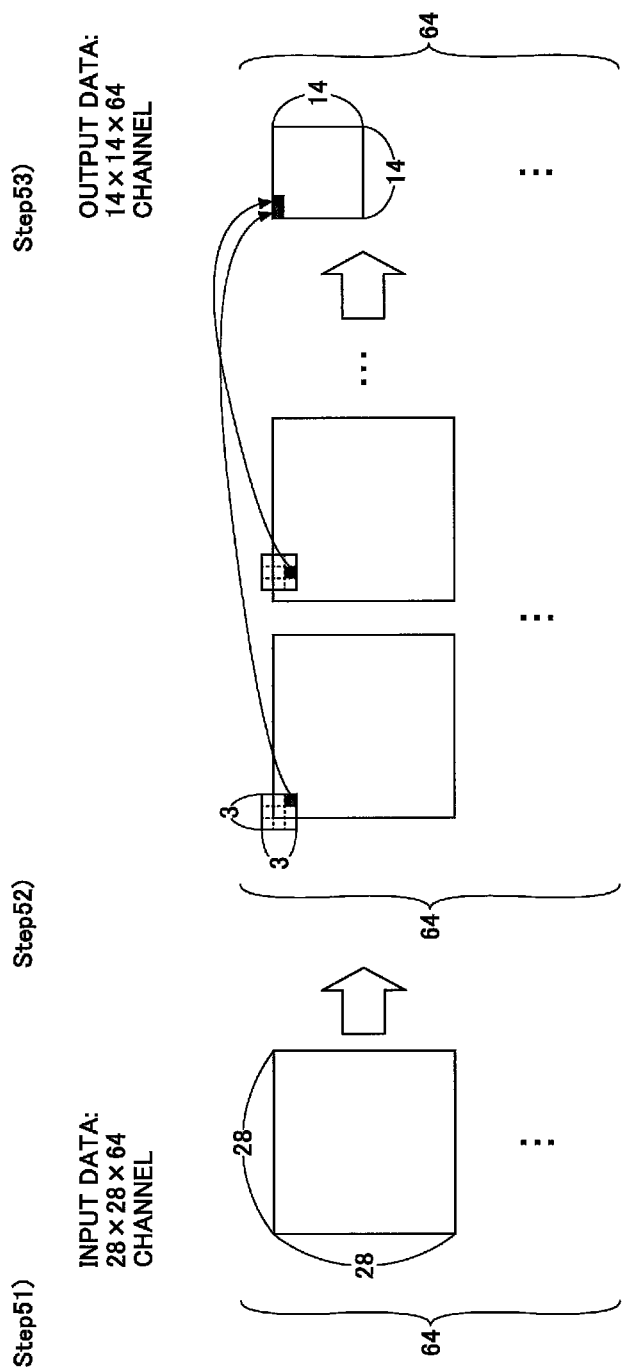
FIG. 13 illustrates an exemplary pooling process for the 2nd layer of the first embodiment.

In step S5, the pooling processing part $40_2$ inputs the image data 1400, and the pooling process is provided to the image data 1400. Referring to FIG. 13, the pooling process of the 2nd layer is explained. FIG. 13 illustrates an exemplary pooling process for the 2nd layer of the first embodiment.

In step 51, the pooling processing part 402 inputs the image data 1400 of 28×28×64 channels.

In step 52, the pooling processing part $40_2$ repeatedly performs processes of outputting the maximum value in an area of 3×3 on the image data 1400 so as to generate an image data (hereinafter, referred to as an "image data 1500") of 14×14×64. For example, this pooling process is performed as described below.

(1) The maximum value in the area of 3×3 counted from the upper left as the center on a single image data 28×28 of the image data 1400 is obtained. This maximum value is set to be a pixel value of the image data 1500 at a pixel position (1,1).

(2) Next, the area of 3×3 is moved right by every 2 while obtaining the maximum values of the pixel values in every area. The obtained maximum values are set to be pixel values at pixel positions (1,2) to (1,14) of the image data 1500.

(3) Next, the area of 3×3 is moved down by 2 and every 2 from the left end while obtaining the maximum values of the pixel values in every area. The obtained maximum values are set to be pixel values at pixel positions (2,1) to (2,14) of the image data 1500. Pixel values (3,1) to (14,14) are obtained in a manner similar thereto.

(4) The above (1), (2), and (3) are performed for all image data of 28×28. Said differently, the above (1), (2), and (3) are performed for 64 image data of 28×28.

In step 53, the pooling processing part $40_2$ outputs the image data 1500 to the convolution processing part $30_3$ of the 3rd layer.

In step S6 of FIG. 4, the convolution processing part $30_3$ of the 3rd layer inputs (receives) the image data 1500 and provides the image data 1500 with the convolution process. Referring to FIG. 14, the convolution process of the 3rd layer is explained. FIG. 14 illustrates an exemplary convolution process for the 3rd layer of the first embodiment.

In step 61, the convolution processing part $30_3$ inputs the image data 1500. The color channel of the input image data 1500 is 14×14×64 channels.

In step 62, the convolution processing part $30_3$ generates a filter from the weight data 3300 and provides a filter process to the image data 1500 using the generated filter. Here, explained below are a data structure of the weight data 3300 and a data structure of a filter $3300f$ generated using the weight data 3300.

Figure 15A:
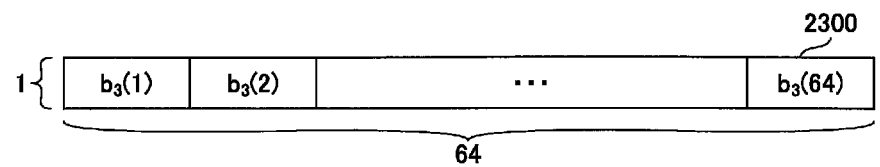
FIGS. 15A and 15B illustrate exemplary data structures of a bias value and a weighted data of a 3rd layer of the first embodiment.
Figure 15B:
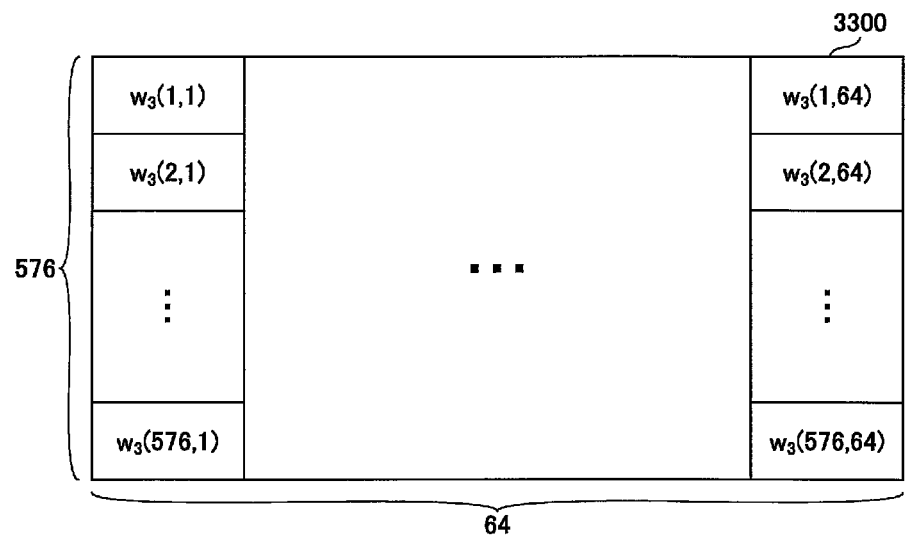

FIG. 15B illustrates an exemplary data structure of the weight data 3300 of the 3rd layer. Referring to FIG. 15B, the weight data 3300 of the 3rd layer has a data structure represented by a matrix of 576×64. Each value $w_3(i,j)$ of the weight data 3300 is previously learnt by the convolution neural network N as described above.

Figure 16:
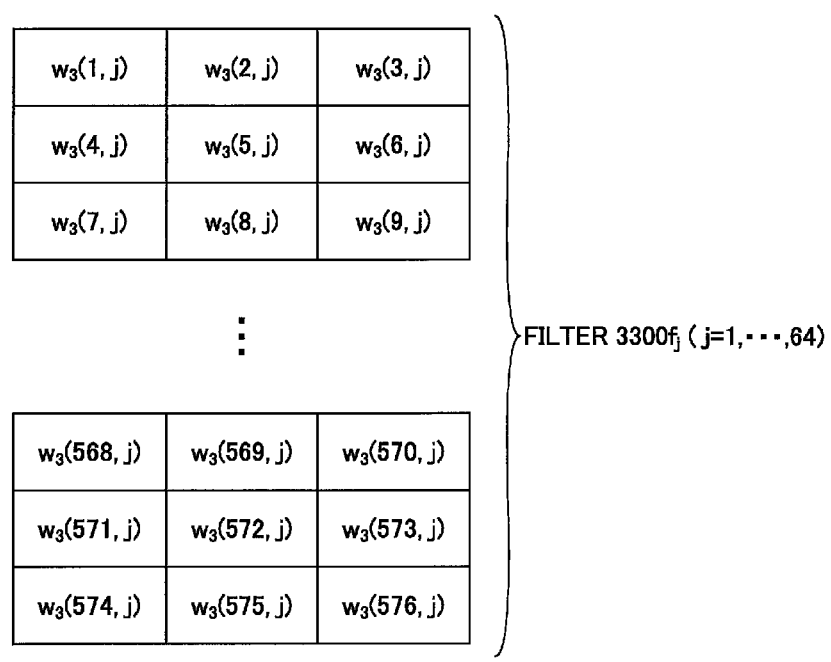
FIG. 16 illustrates an exemplary data structure of a filter of the 3rd layer of the first embodiment.

Next, the data structure of the filter $3300f$ generated from the weight data 3300 is described. FIG. 16 illustrates an exemplary data structure of the filter of the 3rd layer of the first embodiment. Referring to FIG. 16, the filters $3300f$ have a data structure represented by 64 sets of 3×3 matrices. Said differently, each of the filters $3300f$ has a data structure represented by 3×3×64. For example, the filter $3300f_1$ is generated from $w_3(1,1)$ to $w_2(9,1)$, . . . $w_3(568,1)$ to $w_3(576, 1)$. In a manner similar thereto, the filter $3200f_2$ is generated from $w_3(1,2)$ to $w_2(9,2)$, . . . $w_2(568,2)$ to $w_2(576,2)$. Cases where j=3, . . . , 64 are similar to the above.

The convolution processing part $30_3$ provides a filtering process using the filters $3300f$ generated as described above. For example, the filtering process is performed as described below.

(1) The filter $3300f_1$ is provided to the image data 1500 (Said differently, values of the filter $3300f_1$ are multiplied with the image data 1500). For example, a single channel is fixed and the center of the filter $3300f_1$ is shifted right by 3 from the upper left of 14×14. When the center of the filter $3300f_1$ reaches the right end of the portion of 14×14, the center of the filter $3300f_1$ is shifted downward by 3, and the filter $3300f_1$ is applied again from the left end to the portion of 28×28.

(2) Next, the filter $3300f_1$ is applied to another channel of the image data 1500 using a method similar to the above (1). This process is repeatedly applied to all channels 1 to 64.

(3) The filters $3300f_2$ to $3300f_{64}$ are sequentially provided to all the channels (1 to 64) of the image data 1500 in a manner similar to the above.

As described, an image of 14×14×64×64 is obtained from the image data 1500 using the above filtering process.

Next, in step 63, the convolution processing part $30_3$ adds the pixel values of the image data obtained in step 62 for the portion of 14×14 with respect to each of 1 to 64 channels. As a result, the image data of 14×14×64 channels is obtainable.

In step 64, the convolution processing part 303 adds the bias value 2300 to each pixel value of the image data obtained in step 63. FIG. 15A illustrates an exemplary data structure of the bias value 2300 of the 3rd layer. As illustrated in FIG. 15A, the bias value 2300 is represented by a matrix of 1×64. The convolution processing part $30_3$ adds the bias value $b_3(1)$ to each pixel value of a first image data. In a manner similar thereto, a bias value $b_3(2)$ is added to each pixel value of a second image data. In a manner similar thereto, the bias value 2300 is added to each pixel value of all 64 image data.

Subsequently, in step 65, the convolution processing part $30_3$ applies a predetermined activating function to the image data of 14×14×64 channels obtained in step 64 so as to obtain output image data. The predetermined activating function is, for example, a function defined by $f(x)=\max(0, x)$, where x represents an arbitrary pixel value. Hereinafter, the image data of 14×14×64 channels obtained as described above is referred to as an "image data 1600". The convolution processing part $30_3$ outputs the image data 1600 to the total combination processing part 50.

In step S7 of FIG. 4, the total combination processing part 50 of the 4th layer inputs the image data 1600 and provides the total combination process to the image data 1600. The total combination processing part 50 exists for each of the categories. The image data 1600 is input into each of the total combination processing parts 50. Provided that the number of the categories is three, namely, "cuisine" and "other than cuisine", "flower" and "other than flower", and "automobile" and "other than automobile", the total combination processing part 50 includes a total combination processing part $50_1$ for "cuisine" and "other than cuisine", a total combination processing part $50_2$ for "flower" and "other than flower", and a total combination processing part $50_3$ for "automobile" and "other than automobile". Each total combination processing part 50 inputs (receives) the image data 1600.

Figure 17:
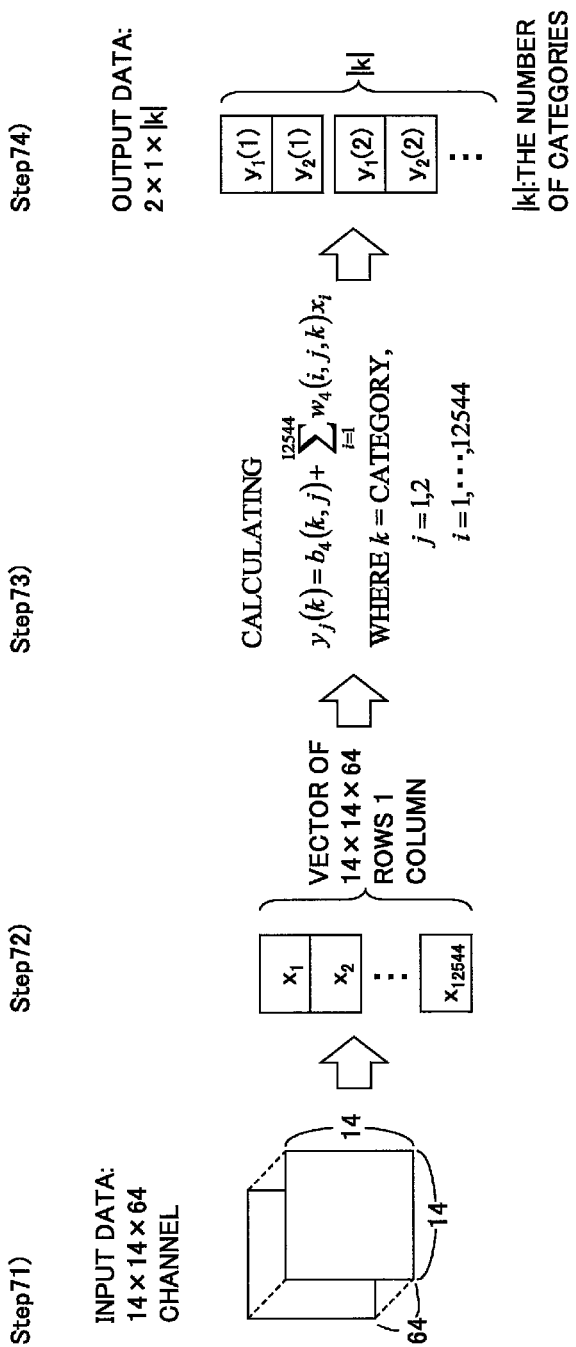
FIG. 17 illustrates an exemplary total combination process for the 4th layer of the first embodiment.

Referring to FIG. 17, the total combination process of the 4th layer is explained. FIG. 17 illustrates an exemplary total combination process for the 4th layer of the first embodiment.

In step 71, the total combination processing part 50 inputs (receives) the image data 1600. The color channel of the input image data 1600 is 14×14×64 channels.

In step 72, the total combination processing part 50 converts each pixel value of the image data 1600 to a vector value. Said differently, each pixel value of the image data 1600 of 14×14×64 channels is converted to a vector value of 12544 rows and 1 column. Here, the values of elements of the vector value is set to be $x_1, \ldots, x_{12544}$.

Figure 18A:
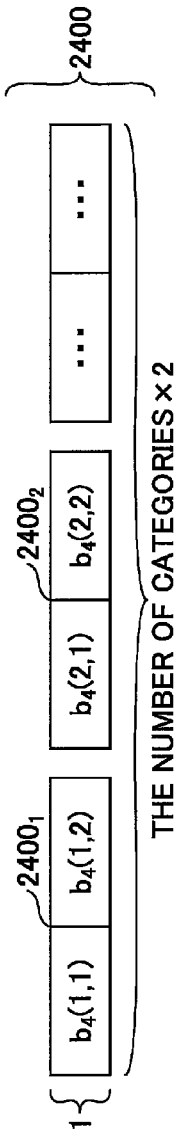
FIGS. 18A and 18B illustrate exemplary data structures of a bias value and a weighted data of a 4th layer of the first embodiment.
Figure 18B:
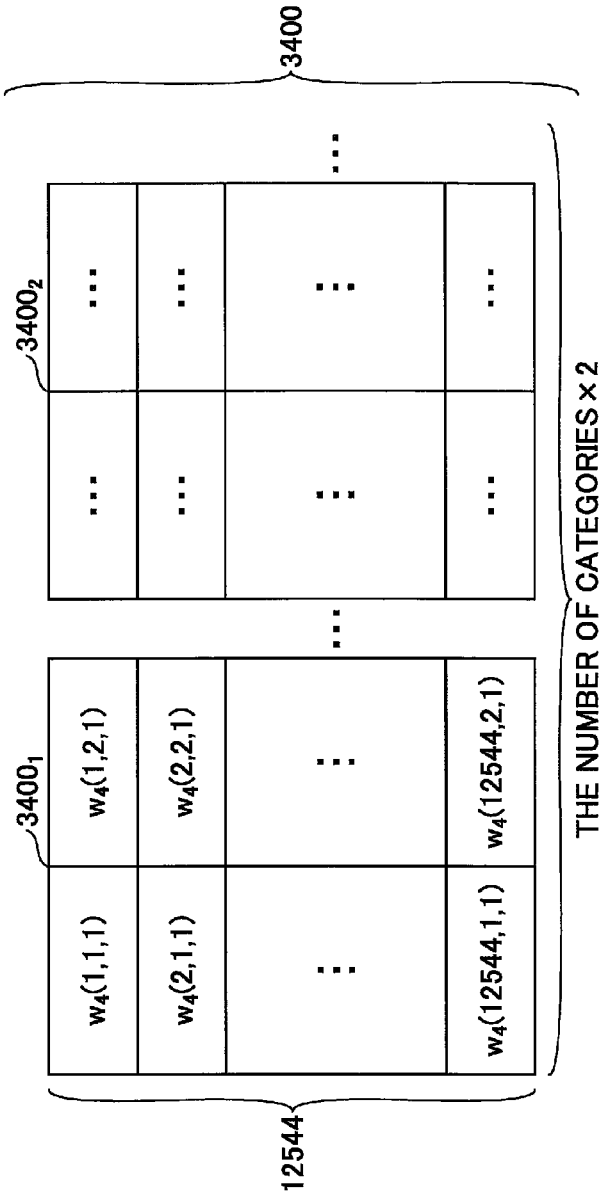

In step 73, the total combination processing part 50 performs a product-sum operation for each category using the bias value 2400 and the weight data 2400. The data structures of the bias value 2400 and the weight data 3400 are described next. FIGS. 18A and 18B illustrate exemplary data structures of the bias value and the weighted data of the 4th layer of the first embodiment.

FIG. 18A illustrates an exemplary data structure of the bias value 2400 of the 4th layer. Referring to 18A, the bias value 2400 of the 4th layer is formed by a bias value $2400_1$, a bias value $2400_2$, ..., respectively for corresponding categories. A bias value $2400_k$ respectively for corresponding categories is a vector value of 1 row and 2 columns. As described above, values $b_4(k,j)$ of elements of the vectors are learnt for each category by the convolution neural network N.

Here, k represents a value indicative of the category. For example, in a case where k=1, the category of "cuisine" and "other than cuisine" is expressed. In a case where k=2, the category of "flower" and "other than flower" is expressed. Further, j represents a value indicative of whether the image data belongs to a specific genre in the category (for example, "cuisine" in the category of "cuisine" and "other than cuisine"). For example, the image data belongs to the category in a case where j=1, and the image data does not belong to the category in a case where j=2.

FIG. 18B illustrates an exemplary data structure of the weight data 3400 of the 4th layer. Referring to FIG. 18B, the weight data 3400 of the 4th layer is formed by a weight data $3400_1$, a weight data $3400_2$, ..., respectively for the categories. The weight data $3400_k, \ldots$, respectively for the categories is a matrix of 12544 rows and 2 columns. As described above, values $w_4(i,j,k)$ of elements of the matrix are learnt for each category by the convolution neural network N.

Referring to FIG. 17, the total combination processing part 50 performs the following product-sum operation for each category. Said differently, the total combination processing part $50_k$ performs the following product-sum operation for the category k.

$$y_j(k) = b_4(k, j) + \sum_{i=1}^{12544} w_4(i, j, k) x_i \quad \text{[Formula 1]}$$

Here, j and k are defined as described above. The obtained data of 2×1×|k| (hereinafter, referred to as a "certainty factor") is output by the total combination processing part 50 to the normalization processing part 60. |k| designates the number of the categories.

The result of the above product-sum operation is a calculation result obtained in a case where the image data 1000 belongs to the category k (j=1) and a calculation result obtained in a case where the image data 1000 does not belong to the category k (j=2). With this, it is possible to determine whether the certain image data belongs to the specific genre of the certain category k or not using a number value. For example, in a case where the value of $y_1(k)$ is 0.7 and the value of $y_2(k)$ is 0.3, it is possible to determine that the image data 1000 belongs to the specific genre of the category with a high probability. Said differently, in a case where the value of $y_1(k)$ is higher than the value of $y_2(k)$ is 0.3, the input image data 1000 belongs to the specific genre of the category k with a high probability (the above "certainty factor" is named for this reason.) However, it is not possible to determine the category to which the image data belongs among the categories with the above calculation result (said differently, it is not possible to compare a certainty factor among the different categories). Therefore, the normalization process is performed in the next step S8.

Figure 19:
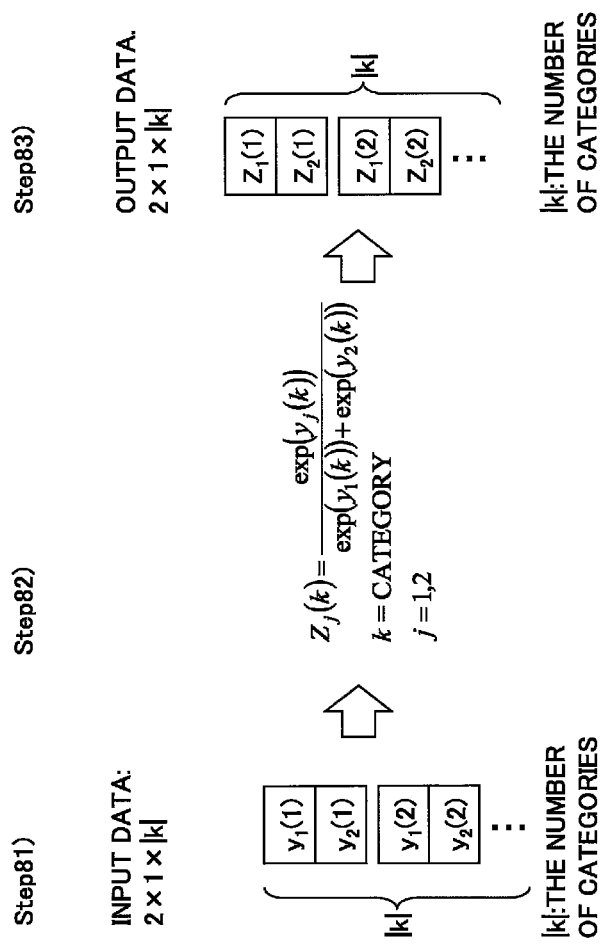
FIG. 19 illustrates an exemplary normalization process of the first embodiment.

In step S8, the normalization processing part 60 inputs the data of 2×1×|k| output from the total combination processing part 50 and performs the normalization process. Referring to FIG. 19, this normalization process is described. FIG. 19 illustrates an exemplary normalization process of the first embodiment.

In step S81, the normalization processing part 60 inputs the data of 2×1×|k| output from the total combination processing part 50.

In step 82, the normalization processing part 60 performs normalization for $(y_1(k), y_2(k))$ of each category using Formula 2.

$$Z_j(k) = \frac{\exp(y_j(k))}{\exp(y_1(k)) + \exp(y_2(k))} \quad \text{[Formula 2]}$$

The obtained data of 2×1×|k| is the certainty factor after the normalization. It is possible to normalize the certainty factor in all categories to have a value of 0 or greater and 1 or smaller by performing the normalization process. Therefore, it is possible to compare the certainty factors of different categories. For example, in a case where k=1 corresponds to the category of "cuisine" and "other than cuisine" and k=2 corresponds to the category of "flower" and "other than flower", when $z_1(1)=0.8$, $z_2(1)=0.2$, $z_1(2)=0.6$, and $z_2(2)=0.4$, the input image data 1000 belongs to the specific genre of the category of "cuisine" with a high probability.

Further, it is possible to appropriately compare the certainty factors between the different categories in a case where there is the image data belonging to genres of the multiple categories (for example, "cuisine" and "flower" are included in the image data 1000).

In step S9, the output part 70 outputs the certainty factor after the normalization output by the normalization processing part 60. An output destination from the output part 70 is not specifically limited. The output part 70 may output to a LCD monitor 10 or the like or to a predetermined program. Therefore, the user may manually label in reference of the certainty factor of the input image data 1000 displayed on the LCD monitor 10 or the like, or may automatically label based on the certainty factor output by the output part 70 using the predetermined program.

[Second Embodiment]

Next, the image processing apparatus 1 of the second embodiment is described. In the image processing apparatus 1 of the second embodiment, the bias value and the weight data are learnt by the image processing apparatus 1 of the first embodiment. Since the outer appearance, the internal structure, and the category identification process of the image processing apparatus 1 are similar to those in the first embodiment, a description thereof is omitted. Within the second embodiment, a portion necessary for a learning process of the image processing apparatus 1 of the first embodiment is described.

<Functional Structure of Image Processing Engine of Image Processing Apparatus>

Figure 20:
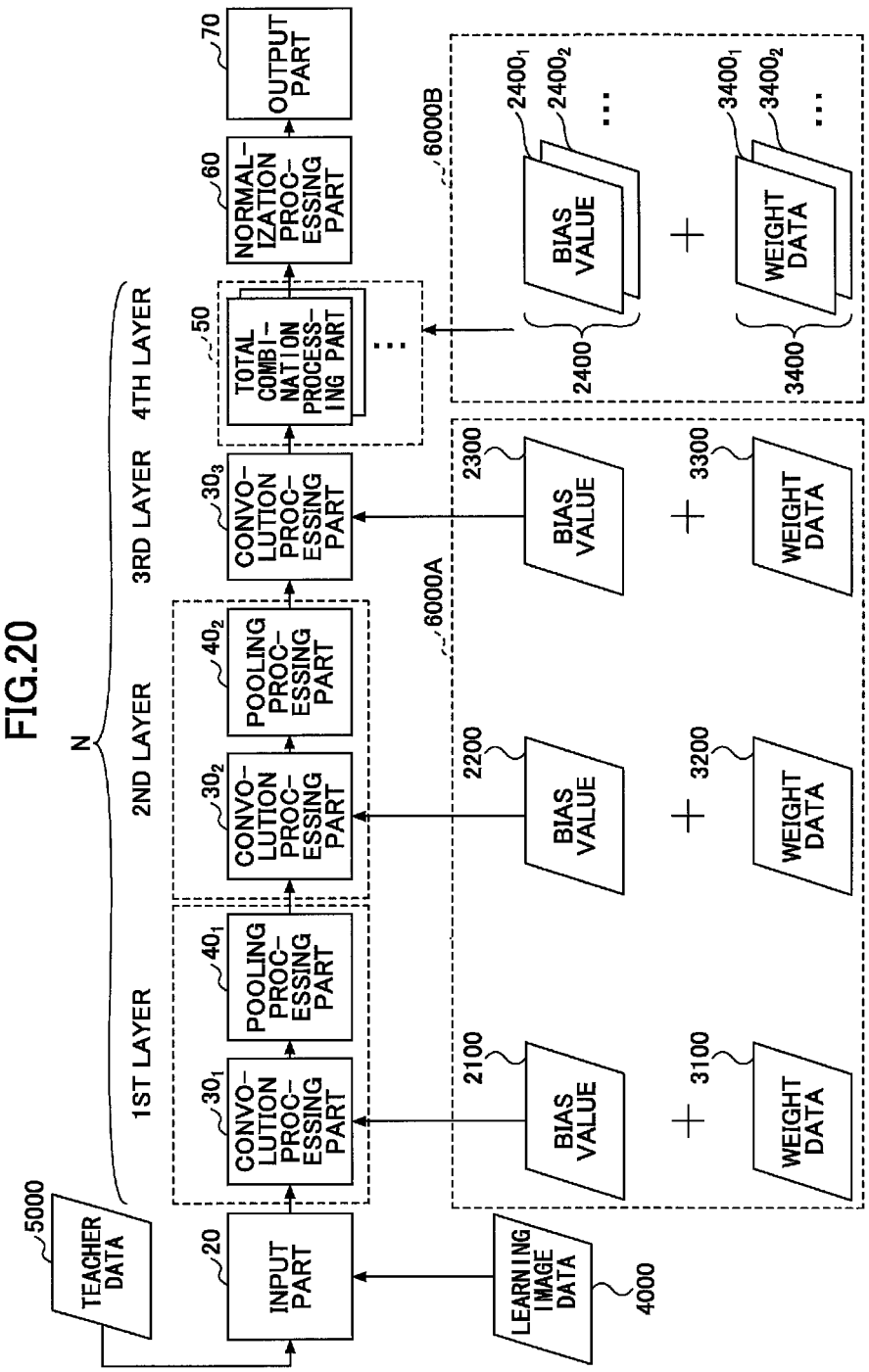
FIG. 20 is a block chart illustrating an exemplary functional structure of an image processing engine of an image processing apparatus of a second embodiment.

Next, a functional structure of the image processing engine 100 of the image processing apparatus 1 of the second embodiment is described. FIG. 20 is a block chart illustrating an exemplary functional structure of the image processing engine of the image processing apparatus of the second embodiment.

The functional structure of the image processing engine 100 of the image processing apparatus 1 of the second embodiment differs from that of the first embodiment at a point that the learning image data 4000 and the teacher data 5000 are included. As explained in the first embodiment, the learning image data 4000 and the teacher data 5000 form a learning data.

The learning image data 4000 is image data used to learn the bias value and the weight data indicated by broken lines 6000A and 6000B, respectively. The learning is to update the bias value and the weighted data so that the output result from the learning image data 4000 fits the teacher data 5000.

The teacher data 5000 is a correct answer label of the learning image data 4000. Said differently, the teacher data 5000 indicates the specific genre of the category, to which the learning image data 4000 belongs.

<Detailed Process>

Figure 21:
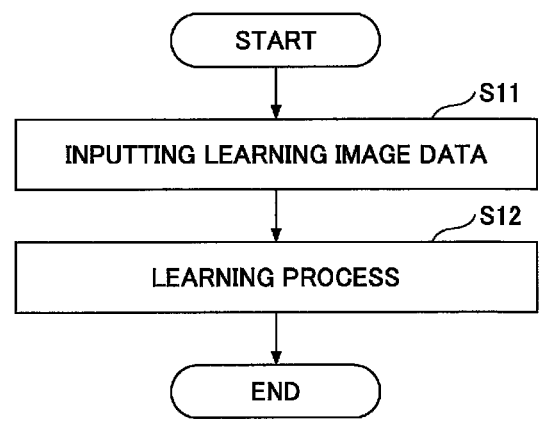
FIG. 21 is a flow chart illustrating an exemplary learning process of the image processing apparatus of the second embodiment.

Next, the image processing apparatus 1 of the second embodiment is described. FIG. 21 is a flow chart illustrating an exemplary learning process of the image processing apparatus of the second embodiment.

In step S11, the input part 20 inputs the learning image data 4000 and the teacher data 5000. It is preferable to perform the learning by causing the learning image data 4000 and the teacher data 5000 of several tens of thousands or hundreds of thousands pieces to be input in order to enable to classify various image data into an appropriate category.

In step S12, the convolution processing part 30 and the total combination processing part 50 updates (learns) the bias value and the weight data based on the learning image data 4000 and the teacher data 5000. This learning may be done using a conventional method such as an error inverse propagation method.

Here, the bias value and the weight data, which are indicated by the broken line 6000A, are solely updated by the learning image data 4000 and the teacher data 5000. On the other hand, only a part of the bias value and the weight data, which are indicated by the broken line 6000B, is updated. The part of the bias value 2400 and the weight data 3400 to be updated corresponds to the specific genre of the category, to which the learning image data 4000 belongs (said differently, the specific genre of the category, to which the teacher data 5000 belongs). For example, in a case where the learning image data 4000 and the teacher data 5000 is the learning data for the category of "cuisine" and "other than cuisine", a learning target is only the bias value $2400_1$ and the weight data $3400_1$, which are used by the total combination processing part $50_1$ corresponding to this category. In a manner similar thereto, in a case where the learning image data 4000 and the teacher data 5000 is the learning data for the category of "flower" and "other than flower", a learning target is only the bias value $2400_2$ and the weight data $3400_2$, which are used by the total combination processing part $50_2$ corresponding to this category.

In the above step S12, after sufficiently performing the learning of the bias value and the weight data, it is unnecessary to perform the learning of the bias value and the weighted data, which are indicated by the broken line 6000A. For example, in a case where the category is added after sufficiently performing the learning of the bias value and the weight data, only learning of the bias value 2400 and the weight data 3400, which correspond to the added category may be done. Thus, the amount of calculation accompanied by the learning process can be reduced.

[Third Embodiment]

Next, the image processing apparatus 1 of the third embodiment is described. For example, Japanese Laid-open Patent Application No. 2013-250809 discloses a method of learning while dividing a distinction among ordinary categories and a distinction among categories, which are apt to cause an erroneous determination, when the image data is classified to the category. This method may not provide an appropriate learning. For example, in a case where the specific genre of the category of "flower" and a specific genre of a category of "sunshine streaming through leaves" exist and the number of the learning image data for the category of "sunshine streaming through leaves" and "other than sunshine streaming through leaves" is extremely smaller than the number of the learning image data for the category of "flower" and "other than flower", an appropriate learning may not be done. In the image processing apparatus 1 of the third embodiment, an appropriate category classification of the image data can be performed in this case. Within the third embodiment, an explanation is given mainly at a portion different from the first embodiment, and a description of a portion having a function the same as the first embodiment or a portion of performing the same process as the first embodiment is appropriately omitted or simplified.

<Functional Structure of Image Processing Engine of Image Processing Apparatus>

Figure 22:
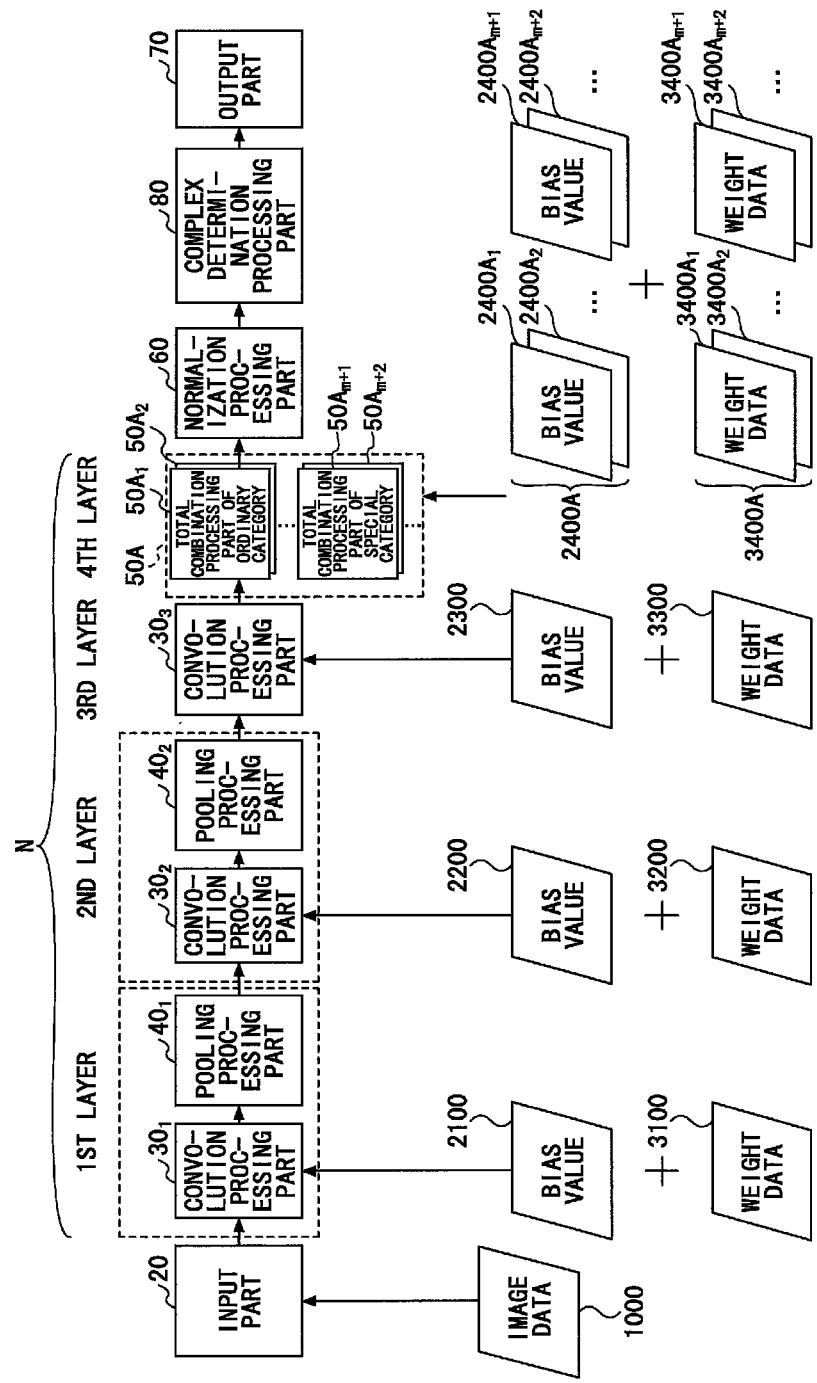
FIG. 22 is a block chart illustrating an exemplary functional structure of an image processing engine of an image processing apparatus of a third embodiment.

At first, a functional structure of the image processing engine 100 of the image processing apparatus 1 of the third embodiment is described. FIG. 22 is a block chart illustrating an exemplary functional structure of the image processing engine of the image processing apparatus of the third embodiment.

After a total combination processing part 50A of the 4th layer provides the image data with the total combination process based on a bias value 2400A and a weight data 3400A, which are previously learnt using the convolution neural network N of the third embodiment, the image data is output to the normalization processing part 60 of the 4th layer. Here, the total combination processing part 50A of the convolution neural network N of the third embodiment is provided for each of the categories. Further, the category of the third embodiment includes an "ordinary category" and a "special category". Accordingly, for example, the ordinary categories are "flower" and "other than flower", "cuisine" and "other than cuisine", "automobile" and "other than automobile", "sunshine streaming through leaves" and "other than sunshine streaming through leaves" and the special category is "flower" and "other than flower", the total combination processing part 50A includes total combination processing parts $50A_1$ to $50A_4$ and a total combination processing part $50A_5$. Ordinarily speaking, when the number of the categories is designated as n, the number of the ordinary categories is designated as m, and the number of the special categories is designated as n–m, the total combination processing part 50A includes total combination processing parts $50A_1$ to $50A_m$ of the ordinary category and a total combination processing part $50A_{m+1}$ to $50A_n$ of the special category. Therefore, in the convolution neural network N of the third embodiment, if the number of the categories (the number of the ordinary categories or the number of the special categories) increases or decreases, it is necessary to add or delete the corresponding total combination processing part 50A. Meanwhile, if the number of the categories increases or decreases, the convolution processing part 30 and the pooling processing part 40 are not added or deleted.

Here, the "ordinary category" and the "special category" included in the category of the third embodiment are described. The "ordinary category" classifies the image data into, for example, "flower" and "other than flower", "cuisine" and "other than cuisine", "automobile" and "other than automobile", "sunshine streaming through leaves" and "other than sunshine streaming through leaves", or the like. Within the third embodiment, a certainty factor of being classified into the specific genre of the category and another certainty factor of not being classified into the specific genre of the category are calculated for each of the ordinary categories. For example, a certainty factor of being classified into "flower" of the ordinary category of "flower" and "other than flower" and another certainty factor of not being classified into "other than flower" of this ordinary category are calculated.

On the other hand, the "special category" is provided to distinguish the specific genre of the ordinary category from the specific genre of the other ordinary category, which specific genres are apt to be confused, when a sufficient learning data for distinguishing these specific genres of the ordinary categories. For example, described is a case where the specific genre of "flower" of the category is apt to be confused with the specific genre of "sunshine streaming through leaves" of the other category. In this case, when an extremely fewer learning image data for the positive specific genre of "sunshine streaming through leaves" of the other ordinary category can be prepared than the learning image data for the specific genre of "flower" of the ordinary category, the special category of "flower" and "other than flower" is provided to enable to distinguish the ordinary category of "flower" and "other than flower" from the ordinary category of "sunshine streaming through leaves" and "other than sunshine streaming through leaves".

The above special category is described in more detail. The following problems occur in a case where 10000 positive examples of the learning image data of the specific genre of "flower" of the ordinary category can be prepared and only 500 positive examples of the learning image data of the specific genre of "sunshine streaming through leaves" of the ordinary category can be prepared (i.e., only 500 negative examples of the learning image data of the specific genre of "flower" of the ordinary category is prepared).

(1) For example, in a case where the target distinction rate is 90% and the learning image data of the above numbers of the positive example and the negative example of the ordinary category "flower" are used for the learning, the target distinction rate can be achieved when all image data used for the learning are recognized to be classified to the specific genre of "flower".

(2) Meanwhile, if the number of the learning image data of the positive example of the ordinary category of "flower" and "other than flower" is reduced to, for example, 500 sheets, the problem of (1) can be solved (said differently, the ordinary category of "flower" and "other than flower" and the ordinary category of "sunshine streaming through leaves" and "other than sunshine streaming through leaves" can be recognized). In this case, a distinction rate of the ordinary category of "flower" and "other than flower" and the ordinary category of "sunshine streaming through leaves" and "other than sunshine streaming through leaves" from the other category (for example, "cuisine" or the like) is lowered.

Therefore, provided in the third embodiment is the special category learnt using an extremely small number of the negative examples in comparison with the number of the positive examples. For example, the number of the positive example and the negative example of the learning image data for the ordinary category of "flower" and "other than flower" are 10000 sheets each. Meanwhile, the number of the positive example of the learning image data for the special category of "flower" and "other than flower" are 4000 sheets, and the number of the negative example of the learning image data for the special category of "flower" and "other than flower" (the number of the positive example of the learning image data for the ordinary category of "sunshine streaming through leaves" and "other than sunshine streaming through leaves") are 500 sheets. As described, the category of the third embodiment includes the ordinary category, to which the input image data are classified, and the special category for distinguishing between the ordinary categories, which are apt to be erroneously distinguished. With this, as described, the input image data can be distinguished even in a case where the ordinary categories, which are apt to be erroneously distinguished, are not sufficiently learnt (said differently, the learning image data of the positive example cannot be sufficiently prepared).

Referring back to FIG. 22, the bias value 2400A and the weight data 3400A are provided for each total combination processing part 50A. For example, in a case where the ordinary categories are "flower" and "other than flower", "cuisine" and "other than cuisine", "automobile" and "other than automobile", and "sunshine streaming through leaves" and "other than sunshine streaming through leaves", and the special category is "flower" and "other than flower", there are a bias value $2400A_1$ and a weight data $3400A_1$ used by the total combination processing part $50A_1$ of the ordinary category of "flower" and "other than flower". In a manner similar thereto, there are a bias value $2400A_2$ and a weight data $3400A_2$ used by the total combination processing part $50A_2$ of the ordinary category of "cuisine" and "other than cuisine", a bias value $2400A_3$ and a weight data $3400A_3$ used by the total combination processing part $50A_3$ of the ordinary category of "automobile" and "other than automobile", and a bias value $2400A_4$ and a weight data $3400A_4$ used by the total combination processing part $50A_4$ of the ordinary category of "sunshine streaming through leaves" and "other than sunshine streaming through leaves". Further, there are a bias value $2400A_5$ and a weight data $3400A_5$ used by the total combination processing part $50A_5$ of the special category of "flower" and "other than flower". Ordinarily, there are the bias values $2400A_1$ to $2400A_m$ and the weight data $3400A_1$ to $3400A_m$ respectively used by the total combination processing part $50A_1$ to $50A_m$ and the bias values $2400A_{m+1}$ to $2400A_n$ and the weight data $3400A_{m+1}$ to $3400A_n$ respectively used by the total combination processing part $50_{m+1}$ to $50_n$.

Thus, the bias value 2400A and the weight data 3400A are values (data) previously learnt for each ordinary category or each special category by the convolution neural network N. On the other hand, the bias values 2100 to 2300 and the weight data 3100 to 3300 are values (data) previously learnt by the convolution neural network N in common with all ordinary categories (when the special category is learnt, the bias values 2100 to 2300 and the weight data 3100 to 3300 are not updated). These bias values 2100 to 2300 and weight data 3100 to 3300 are called a network coefficient or a network combination coefficient of the convolution neural network N, and an example of a first coefficient in claims. Further, the bias values $2400A_1$ to $2400A_m$ and weight data $3400A_1$ to $3400A_m$ are an example of a second coefficient in claims. The bias values $2400A_{m+1}$ to $2400A_n$ and weight data $3400A_{m+1}$ to $3400A_n$ are an example of a third coefficient in claims.

The complex determination processing part 80 determines whether the input image data is classified to the ordinary category or the other ordinary category, which is apt to be erroneously distinguished, based on a certainty factor of the ordinary category and a certainty factor of the special category corresponding to the ordinary category based on a processing result obtained by the normalization processing part 60. For example, when there are the ordinary category of "flower" and "other than flower", the ordinary category of "sunshine streaming through leaves" and "other than sunshine streaming through leaves", which is apt to be erroneously distinguished from the above ordinary category, and the special category of "flower" and "other than flower" corresponding to the ordinary category of "flower" and "other than flower", it is determined whether the input image data is classified to the ordinary category of "flower" and "other than flower" or the ordinary category of "sunshine streaming through leaves" and "other than sunshine streaming through leaves" based on a certainty factor of the ordinary category "flower" and "other than flower" and a certainty factor of the special category of "flower" and "other than flower".

The output part 70 outputs the certainty factor normalized by the normalization processing part 60 based on the processing result obtained by the complex determination processing part 80.

<Detailed Process>

Figure 23:
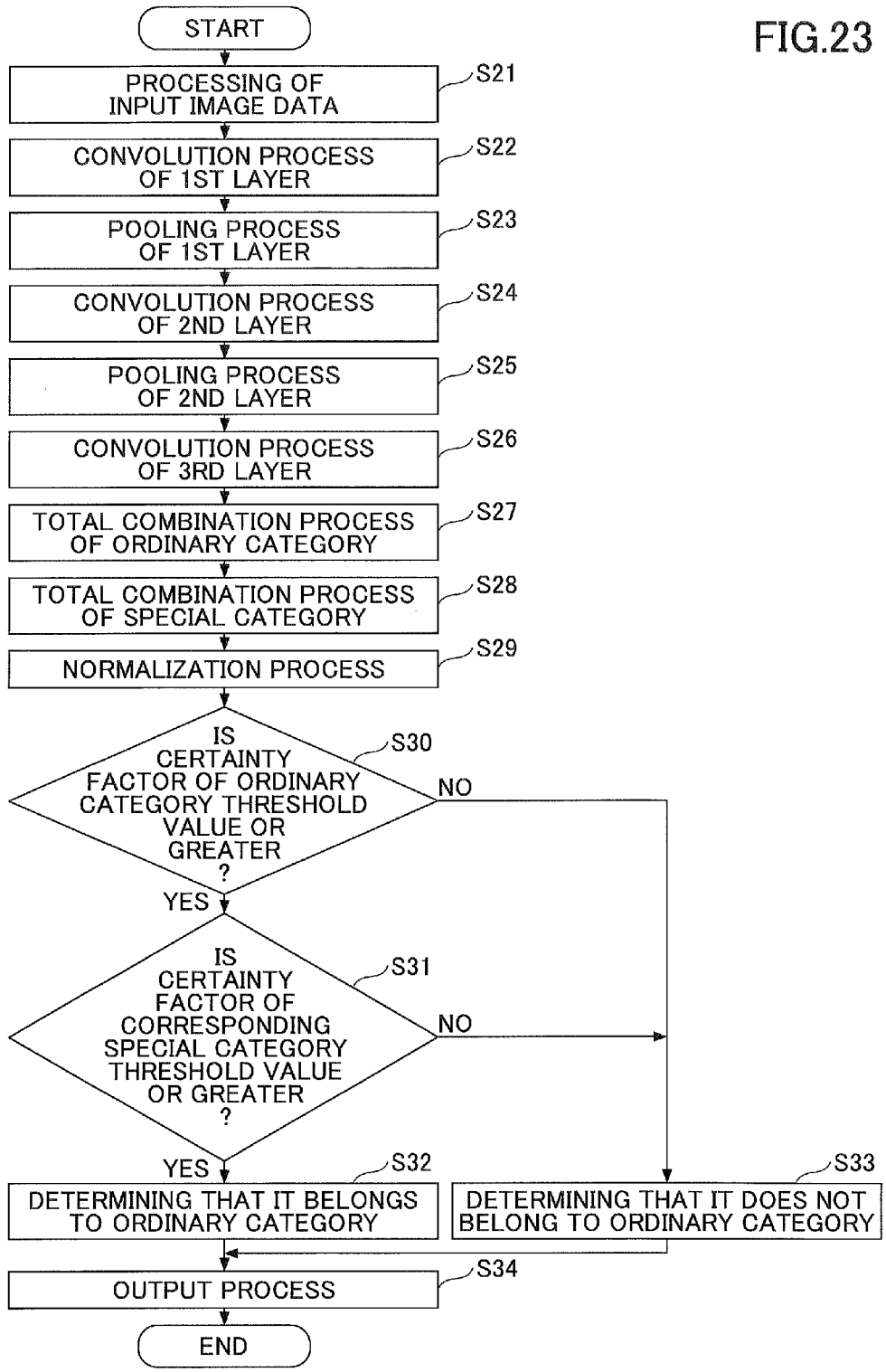
FIG. 23 illustrates an exemplary flowchart of a category identification process in the image processing apparatus of the first embodiment.

Next, the image processing apparatus 1 of the third embodiment is described. FIG. 23 illustrates an exemplary flowchart of a category identification process in the image processing apparatus of the third embodiment. With this process, the image processing apparatus 1 of the third embodiment can calculate a certainty factor indicative of a classification of one of the predetermined categories, to which the input image data belongs. The ordinary category, to which the input image data is classified, can be distinguished by the calculated certainty factor.

Because the processes of steps S21 to S26 are similar to the processes of steps S1 to S6, an explanation is omitted. In step S26, the convolution processing part $30_3$ outputs the image data 1600 to the total combination processing part 50A.

In step S27, the total combination processing part $50A_1$ to $50A_m$ of the ordinary category included in the total combination processing part 50A of the 4th layer input the image data 1600 and performs the total combination process for the image data 1600. The total combination processing part $50A_1$ to $50A_m$ exist for each of the ordinary categories. The image data 1600 is input into the total combination processing parts $50A_1$ to $50A_m$ of the ordinary categories. For example, in a case where the ordinary categories are four, namely, "flower" and "other than flower", "cuisine" and "other than cuisine", "automobile" and "other than automobile", and "sunshine streaming through leaves" and "other than sunshine streaming through leaves", all the total combination processing parts $50A_1$ to $50A_4$ corresponding to the ordinary categories input the image data 1600 and perform the total combination process.

Figure 24:
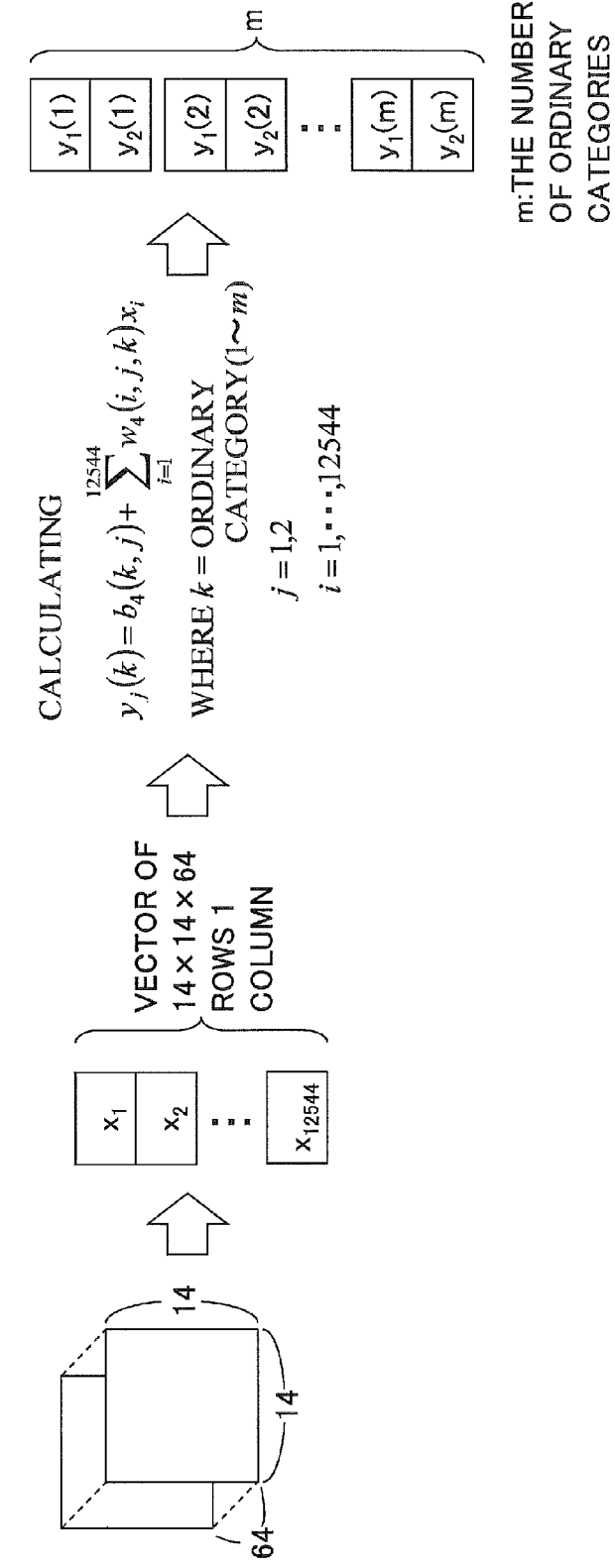
FIG. 24 illustrates an exemplary total combination process of an ordinary category for the 4th layer of the third embodiment.

Referring to FIG. 24, the total combination process of the ordinary category of the 4th layer is explained. FIG. 24 illustrates an exemplary total combination process of an ordinary category for the fourth layer of the third embodiment. Hereinafter, a total combination processing part $50A_k$ of the ordinary category is explained, where k is a natural number between 1 to m. Here, k represents a value indicative of the category. For example, in a case where k=1, the category of "flower" and "other than flower" is expressed. In a case where k=2, the category of "cuisine" and "other than cuisine" is expressed.

In step 271, the total combination processing part 50A$_k$ of the ordinary category inputs (receives) the image data 1600. The color channel of the input image data 1600 is 14×14×64 channels.

In step 272, the total combination processing part 50A$_k$ of the ordinary category converts each pixel value of the image data 1600 to a vector value. Said differently, each pixel value of the image data 1600 of 14×14×64 channels is converted to a vector value of 12544 rows and 1 column. Here, the values of elements of the vector value is set to be $x_1, \ldots, x_{12544}$.

Figure 25A:
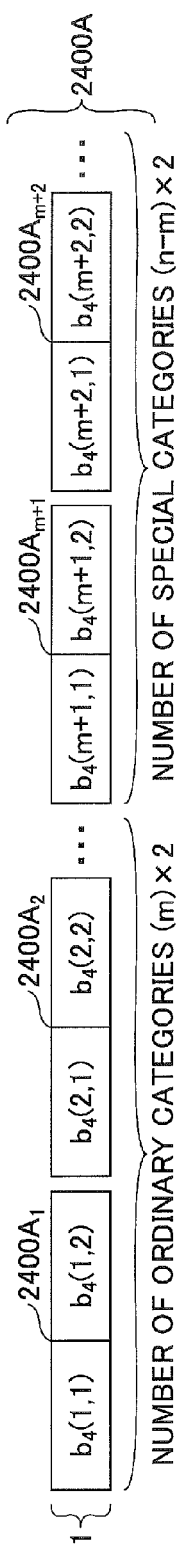
FIGS. 25A and 25B illustrate exemplary data structures of a bias value and a weighted data of the 4th layer of the fourth embodiment.
Figure 25B:
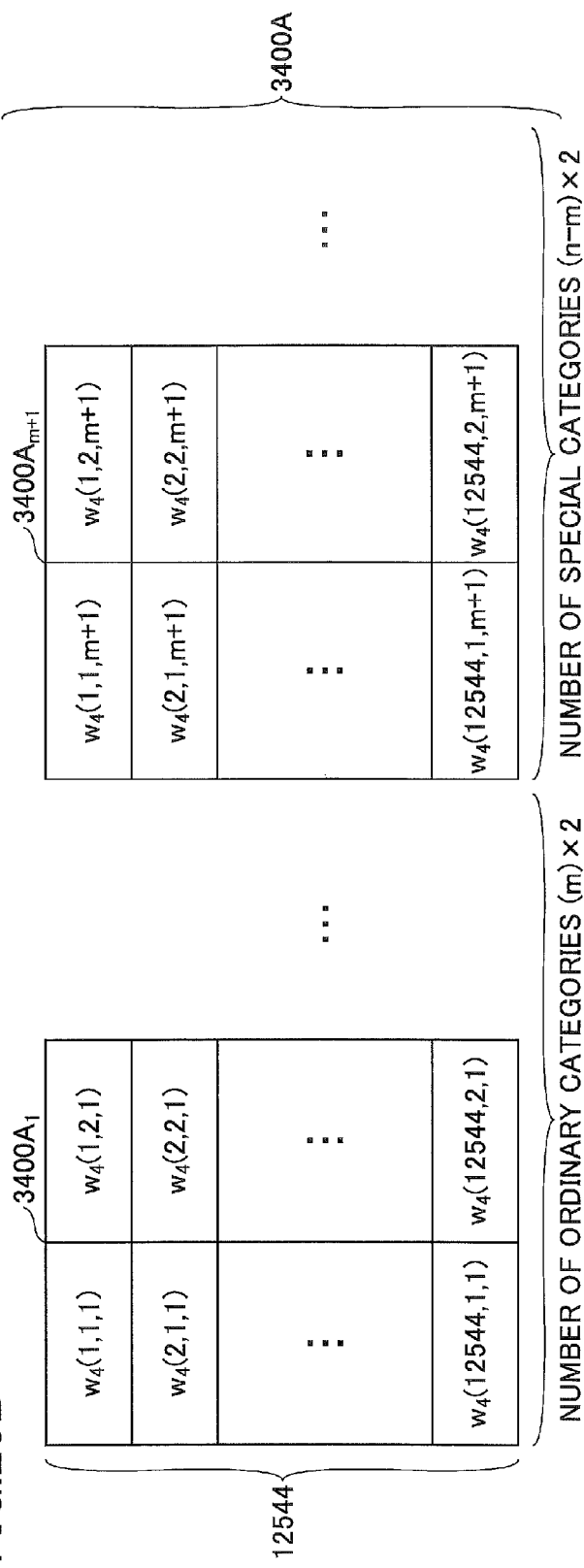

In step 273, the total combination processing part 50A$_k$ of the ordinary category performs a product-sum operation for each category using the bias value 2400 and the weight data 3400. The data structures of the bias value 2400 and the weight data 3400 are described next. FIGS. 25A and 25B illustrate exemplary data structures of the bias value and the weighted data of the 4th layer of the third embodiment.

FIG. 25A illustrates an exemplary data structure of the bias value 2400 of the 4th layer. As described in FIG. 25A, the bias value 2400A of the 4th layer is formed by bias values 2400A$_1$, 2400A$_2$, ..., 2400A$_m$ of the ordinary category and the bias values 2400A$_{m+1}$, 2400A$_{m+2}$, ..., 2400A$_n$ of the special category. Further, the bias values 2400A$_k$ (k=1 to n) are vector values of 1 row and 2 columns. As described above, values $b_4(k,j)$ of elements of the vectors are learnt for each ordinary category by the convolution neural network N, where k=1 to m. Meanwhile, values $b_4(k,j)$ of elements of the vectors are learnt for each special category by the convolution neural network N, where k=m+1 to n. Here, j is a number indicative of whether the image data is classified to a proper category. For example, in a case where j=1, the image data is classified to the proper category. In a case where j=2, the image data is not classified to the proper category.

FIG. 25B illustrates an exemplary data structure of the weight data 3400A of the 4th layer. As illustrated in FIG. 25B, the weight data 3400A of the 4th layer is formed by the weight data 3400A$_1$, 3400A$_2$, ..., 3400A$_m$ of the ordinary category and the weight data 3400A of the 4th layer is formed by the weight data 3400A$_{m+1}$, 3400A$_{m+2}$, ..., 3400A$_n$ of the special category. Further, the weight value 3400A$_k$ (k=1 to n) of the ordinary category and the special category is a matrix of 12544 row and 2 columns. As described above, values $w_4(i,j,k)$ of elements of the matrix are learnt for each ordinary category by the convolution neural network N, where k=1 to m. Meanwhile, values $w_4(i,j,k)$ of elements of the matrix are learnt for each special category by the convolution neural network N, where k=m+1 to n.

Referring to FIG. 24, the total combination processing part 50A$_k$ performs the following product-sum operation for each ordinary category.

$$y_j(k) = b_4(k, j) + \sum_{i=1}^{12544} w_4(i, j, k) x_i \quad \text{[Formula 3]}$$

where $$k = 1, \ldots, m,$$
$$j = 1, 2$$

The obtained data of 2×1×|k| (hereinafter, referred to as the "certainty factor") is output by the total combination processing part 50A to the normalization processing part 60.

The result of the above product-sum operation is a calculation result obtained in a case where the input image data 1000 is classified to the ordinary category k (j=1) and a calculation result obtained in a case where the input image data 1000 is not classified to the ordinary category k (j=2). With this, it is possible to determine, as a numerical value, whether the certain image data 1000 is classified or is not classified to the certain ordinary category k. For example, in a case where the value of $y_1(k)$ is 0.7 and the value of $y_2(k)$ is 0.3 for the certain ordinary category (for example, the ordinary category of "flower" and "other than flower"), it is possible to determine that the image data 1000 is classified into the specific genre of the category with a high probability. Said differently, in a case where the value of $y_1(k)$ is greater than the value of $y_2(k)$ for the certain category k, the input image data 1000 is classified into the ordinary category k with a high probability. The above "certainty factor" is named for the probability. On the other hand, in a case where the value of $y_1(k)$ is smaller than the value of $y_2(k)$ for the certain category k, the input image data 1000 is classified into the ordinary category k with a low probability.

In step S28, the total combination processing parts 50A$_{m+1}$ to 50A$_n$ of the special category included in the total combination processing part 50A of the 4th layer input the image data 1600 and performs the total combination process for the image data 1600. The total combination processing part 50A$_{m+1}$ to 50A$_n$ of the special category exist for each of the special categories. The image data 1600 is input into the total combination processing parts 50A$_{m+1}$ to 50A$_n$ of the special categories. For example, in a case where the special categories are two, namely, "flower" and "other than flower" and "cuisine" and "other than cuisine", each of the total combination processing parts 50A$_1$ and 50A$_2$ corresponding to the ordinary categories inputs image data 1600 and performs the total combination process.

Figure 26:
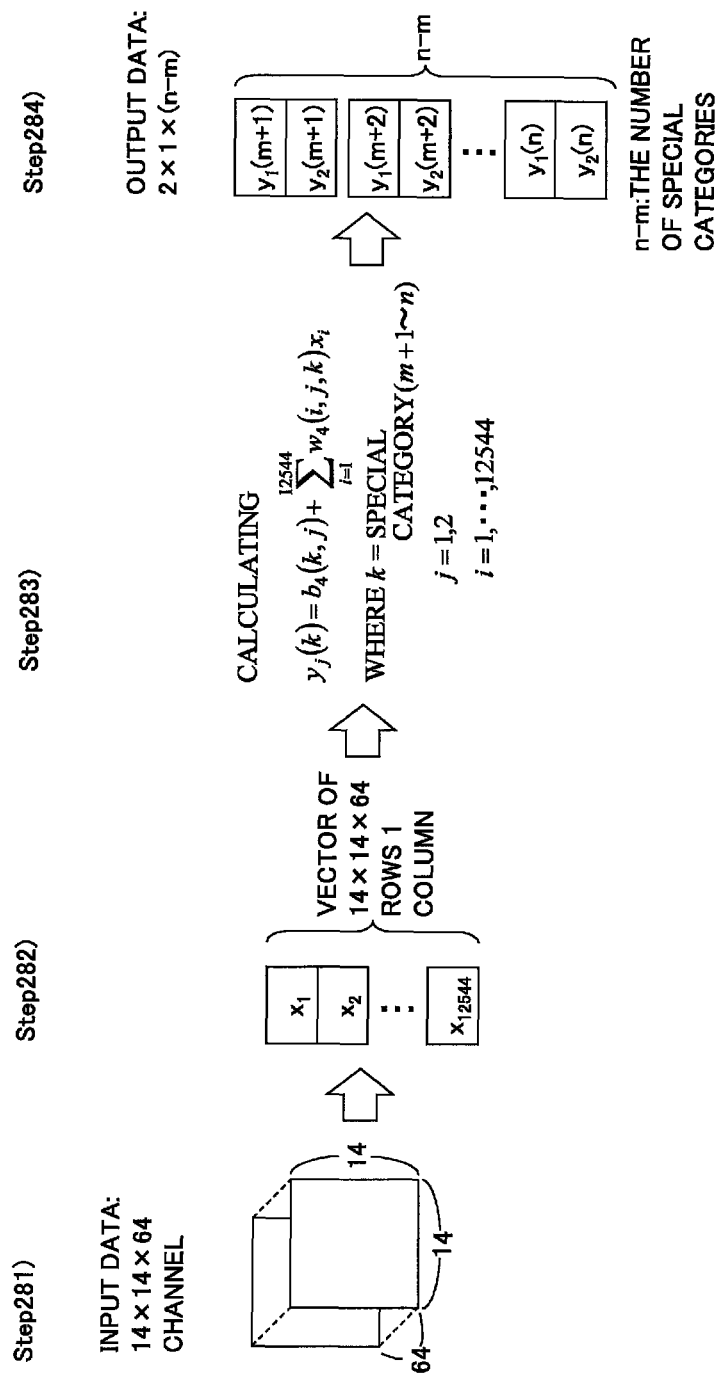
FIG. 26 illustrates an exemplary total combination process of a special category for the 4th layer of the third embodiment.

Referring to FIG. 26, the total combination process of the special category of the 4th layer is explained. FIG. 26 illustrates an exemplary total combination process of the special category for the 4th layer of the third embodiment. Hereinafter, a total combination processing part 50A$_k$ of the special category is explained, where k is a natural number between m+1 to n. Here, k represents a numerical value indicative of the category. For example, in a case where k=m+1, the category of "flower" and "other than flower" is expressed. In a case where k=m+2, the category of "cuisine" and "other than cuisine" is expressed.

In step 281, the total combination processing part 50A$_k$ of the special category inputs (receives) the image data 1600. The color channel of the input image data 1600 is 14×14×64 channels.

In step 282, the total combination processing part 50A$_k$ of the special category converts each pixel value of the image data 1600 to a vector value. Said differently, each pixel value of the image data 1600 of 14×14×64 channels is converted to a vector value of 12544 rows and 1 column. Here, the values of elements of the vector value is set to be $x_1, \ldots, x_{12544}$.

In step 283, the total combination processing part $50A_k$ of the special category performs the following product-sum operation using the bias value 2400A and the weight data 2400A, which are explained using FIGS. 25A and 25B.

$$y_j(k) = b_4(k, j) + \sum_{i=1}^{12544} w_4(i, j, k) x_i \quad \text{[Formula 4]}$$

where $$k = m+1, \ldots, n,$$
$$j = 1, 2$$

The obtained certainty factor of 2×1×(n−m) is output by the total combination processing part 50A to the normalization processing part 60.

The result of the above product-sum operation is a calculation result obtained in a case where the input image data 1000 is classified to the special category k (j=1) and a calculation result obtained in a case where the input image data 1000 is not classified to the special category k (j=2). In order to enable a mutual comparison of the certainty factor calculated in steps S7 and S8, the normalization process is performed in step S29.

Figure 27:
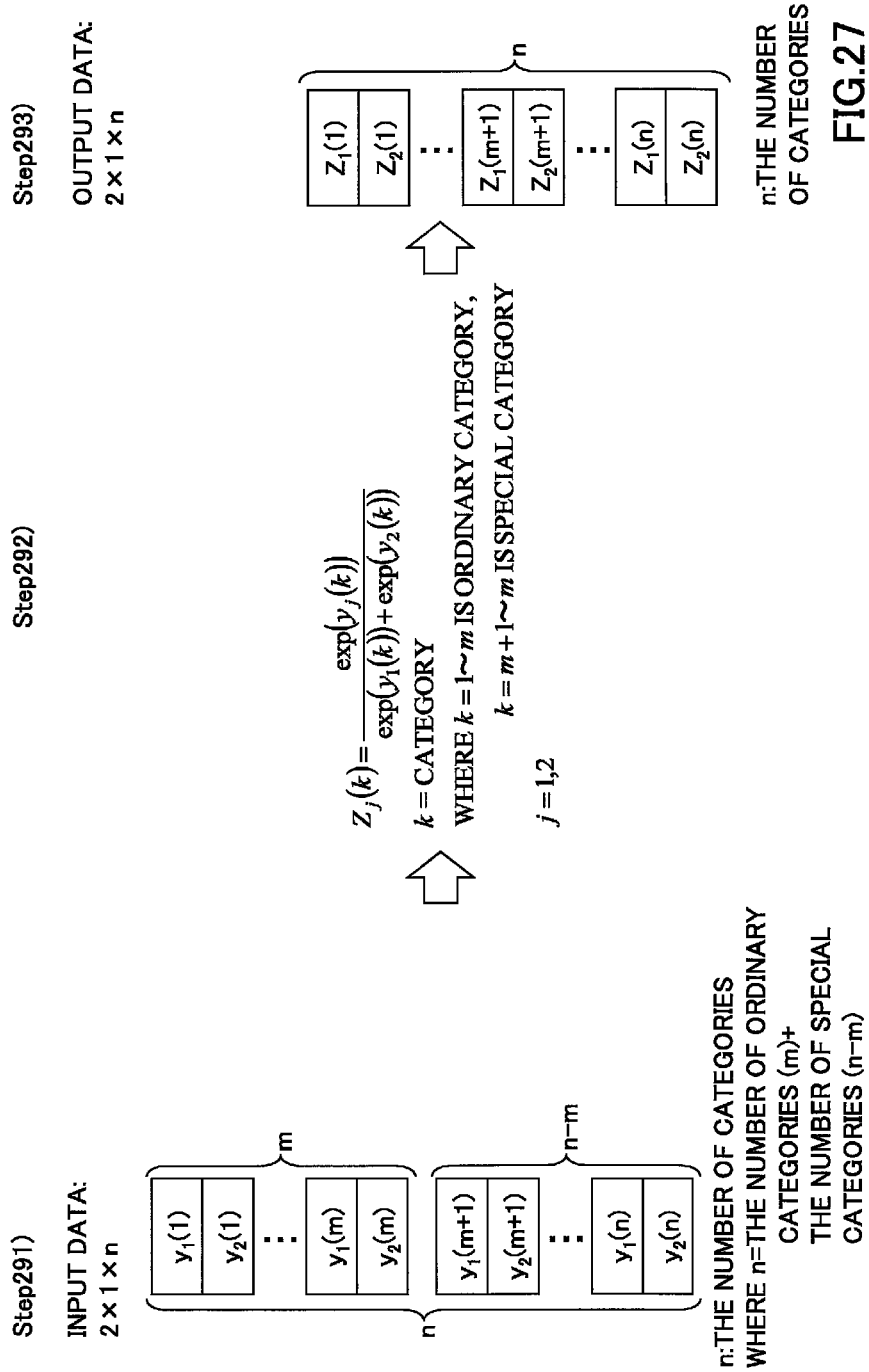
FIG. 27 illustrates an exemplary normalization process of the third embodiment.

In step S29, the normalization processing part 60 inputs data of 2×1×m output from the total combination processing part $50A_1$ to $50A_m$ of the ordinary category and output from the total combination processing part $50A_{m+1}$ to $50A_n$ of the ordinary category, and performs the normalization process. Said differently, the normalization processing part 60 inputs the data of 2×1×|k| output from the total combination processing part 50A and performs the normalization process. Referring to FIG. 27, this normalization process is described. FIG. 27 illustrates an exemplary normalization process of the third embodiment.

In step S291, the normalization processing part 60 inputs the data of 2×1×|k| output from the total combination processing part 50A.

In step 292, the normalization processing part 60 performs normalization for $(y_1(k), y_2(k))$ of each ordinary category and each special category using the following formula.

$$Z_j(k) = \frac{\exp(y_j(k))}{\exp(y_1(k)) + \exp(y_2(k))} \quad \text{[Formula 5]}$$

where $$k = 1, \ldots, m, m+1, \ldots, n,$$
$$j = 1, 2$$

The obtained data of 2×1×|k| is the certainty factor after the normalization. It is possible to normalize the certainty factors in the ordinary and special categories to have a value of 0 or greater and 1 or smaller by performing the normalization process. Therefore, it is possible to compare the certainty factors of different categories. For example, in a case where k=1 corresponds to the category of "flower" and "other than flower" and k=2 corresponds to the category of "cuisine" and "other than cuisine", when $z_1(1)=0.8$, $z_2(1)=0.2$, $z_1(2)=0.6$, and $z_2(2)=0.4$, the input image data 1000 is classified into the category of "flower" and "other than flower" more than "cuisine" and "other than cuisine" with a high probability.

Further, it is possible to appropriately compare the certainty factors between the different ordinary categories in a case where there is the image data belonging to specific genres of the multiple ordinary categories (for example, "flower" and "cuisine" are included in the image data 1000).

Further, it is possible to determine one ordinary category, to which the image data 1000 is classified, between the ordinary categories, which are apt to be erroneously distinguished, by performing a predetermined determination based on the certainty factor of the ordinary category and the certainty factor of the special category corresponding to the ordinary category. This determination method is described in the following S30 to S33. The certainty factor described below is normalized in step S29 as long as it is not differently described. Further, the normalized certainty factor is an example of a candidate value of the certainty factor.

In step S30, the complex determination processing part 80 determines whether the certainty factor of the ordinary category is a predetermined threshold value or greater. For example, the complex determination processing part 80 determines whether the certainty factor $y_1(1)$ of the ordinary category of "flower" and "other than flower", which corresponds to k=1, is equal to the predetermined threshold value or greater. In a case where the certainty factor of the ordinary category is equal to the threshold value or greater, the process goes to step S31. On the other hand, in a case where the certainty factor of the ordinary category is smaller than the predetermined threshold value, the process goes to step S33. In a case where the certainty factor of the ordinary category is determined to be equal to the predetermined threshold or greater, if there is no special category corresponding to the ordinary category, the process goes to step S32. Said differently, if there is no special category corresponding to the ordinary category, step S31 is not performed. For example, regarding the ordinary category of "automobile" and "other than automobile" having no corresponding special category, if the certainty factor the ordinary category of "automobile" and "other than automobile" is equal to the predetermined threshold or greater, step S32 is performed without performing S31. Ordinarily, when there is the special categories as special category k=m+1, . . . , n, and the certainty factors of the ordinary categories k=1, . . . , n−m corresponding to the special categories are equal to the predetermined threshold value or greater, the process goes to step S31. When these certainty factors of the ordinary categories k=1, . . . , n−m is smaller than the predetermined threshold value, the process goes to step S33. On the other hand, when the certainty factors of the ordinary categories k=n−m+1, . . . , m is equal to the predetermined threshold value or greater, the process goes to step S32. When these certainty factors of the ordinary categories k=n−m+1, . . . , m is smaller than the predetermined threshold value, the process goes to step S33.

Here, the certainty factor of the ordinary category compared with the predetermined threshold value is either the certainty factor of being classified into the ordinary category (i.e., $y_1(k)$) or the certainty factor of not being classified into the ordinary, category (i.e., $y_2(k)$). The predetermined threshold value can be determined as a design choice and can be appropriately changed. Ordinarily, if the threshold value is set high, an erroneous distinction can be prevented. However, an image data including an object belonging to specific genres of multiple ordinary categories may not be classified into any one of the specific genres of multiple ordinary categories.

In step S31, the complex determination processing part 80 determines whether the certainty factor of the special category is the predetermined threshold value or greater. For example, the complex determination processing part 80 determines whether the certainty factor $y_1(1)$ of the special category of "flower" and "other than flower", which corresponds to k=m+1, is equal to the predetermined threshold value or greater. Ordinarily, it is determined whether the certainty factor of the special category k=m+1, . . . , n is equal to the predetermined threshold value or greater. In a case where the certainty factor of the special category is equal to the threshold value or greater, the process goes to step S32. On the other hand, in a case where the certainty factor of the special category is smaller than the predetermined threshold value, the process goes to step S33.

In step S32, the complex determination processing part 80 determines that the input image data 1000 is classified into the ordinary category corresponding to the special category.

In step S33, the complex determination processing part 80 determines that the input image data 1000 is not classified into the ordinary category corresponding to the special category.

The above steps S32 and S33 is further described for an example where the ordinary category of "flower" and "other than flower" has a certainty factor $y_1(1)$ and the special category of "flower" and "other than flower" has a certainty factor $y_1(m+1)$. In a case where $y_1(1)$ is determined to have the predetermined threshold value or greater in step S31, the image data 1000 is classified into the ordinary category of "flower" and "other than flower". However, the ordinary category of "flower" and "other than flower" is not sufficiently provided with the learning image data for classifying into the ordinary category of "sunshine streaming through leaves" and "other than sunshine streaming through leaves", which is apt to be erroneously distinguished from the ordinary category of "flower" and "other than flower". Therefore, in step S32, it is determined whether $y_1(m+1)$ is equal to the predetermined threshold value or greater. The learning is performed as follows. The number of the positive examples of the special category of "flower" and "other than flower" is adjusted in conformity with the number of the learning image data classified into the ordinary category of "sunshine streaming through leaves" and "other than sunshine streaming through leaves", which is apt to be erroneously distinguished from the ordinary category of "flower" and "other than flower". Then, only the bias value 2400A and the weight data 3400A are updated for the learning. Therefore, when $y_1(1)$ is equal to the predetermined threshold value or greater and $y_1(m+1)$ is smaller than the predetermined threshold value, the image data 1000 is classified to the ordinary category of "flower" and "other than flower" with a low provability. Said differently, in this case, the erroneous distinction occurs in calculating the certainty factor of the ordinary category of "flower" and "other than flower". Therefore, the image data 1000 is classified into the ordinary category of "sunshine streaming through leaves" and "other than sunshine streaming through leaves" with a high probability. With this, the erroneous distinction between the ordinary categories without sufficient learning can be prevented.

In step S34, the output part 70 outputs the certainty factor. The output certainty factor of the ordinary category without having the corresponding special category has been normalized. On the other hand, as to the ordinary category having the corresponding special category, in a case where it is determined that the image data is classified into the ordinary category in step S32, the certainty factor of the ordinary category after the normalization is output. In a case where it is determined that the image data is not classified into the ordinary category in step S33, the certainty factor of the ordinary category is not output. The certainty factor of the special category is not output.

[Fourth Embodiment]

Next, the image processing apparatus 1 of the fourth embodiment is described. In the image processing apparatus 1 of the fourth embodiment, the bias value and the weight data are learnt by the image processing apparatus 1 of the third embodiment. Since the outer appearance, the internal structure, and the category identification process of the image processing apparatus 1 are similar to those in the third embodiment, a description thereof is omitted. Within the fourth embodiment, a portion necessary for the learning process of the image processing apparatus 1 of the third embodiment is described.

<Functional Structure of Image Processing Engine of Image Processing Apparatus>

Figure 28:
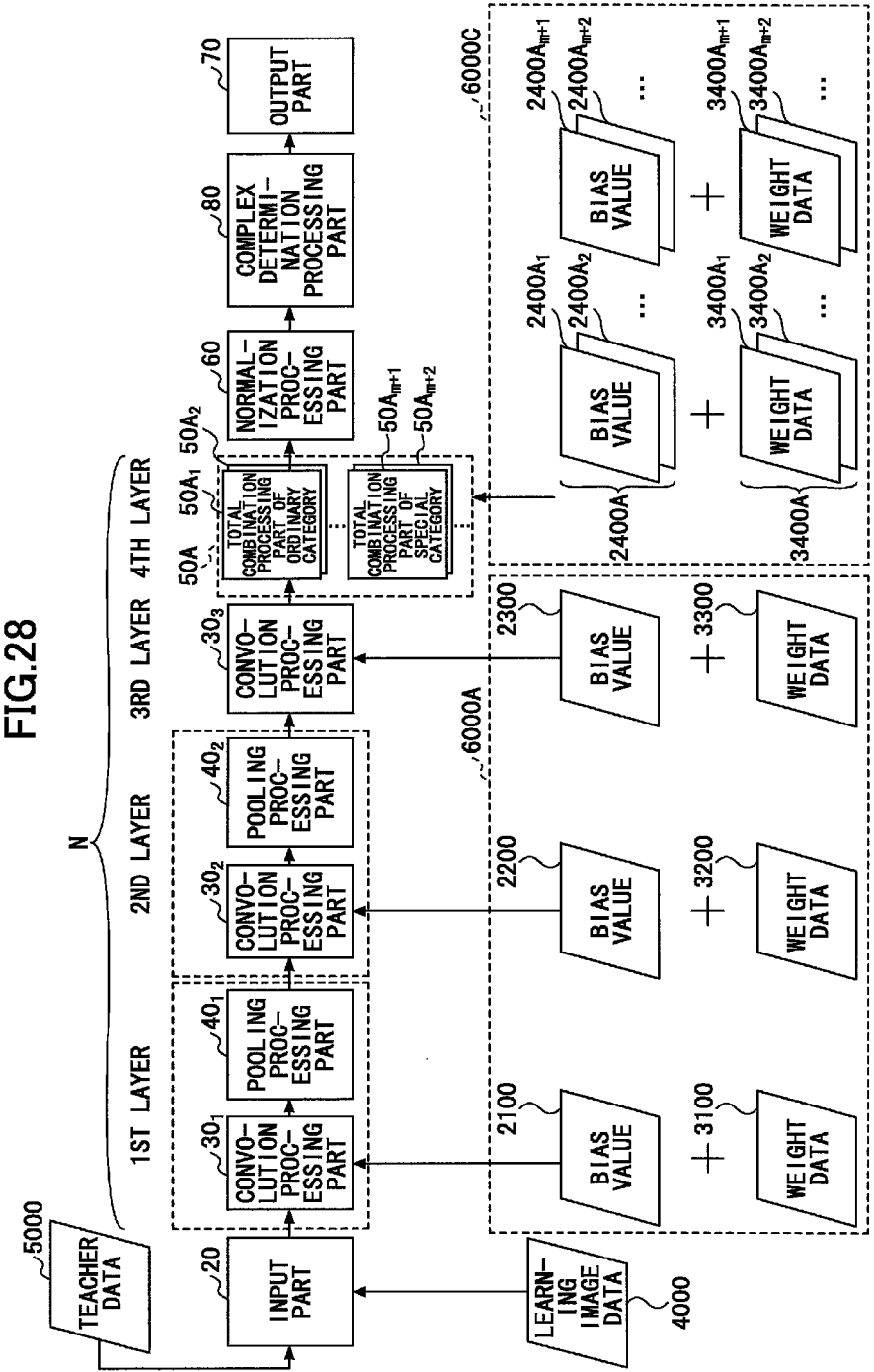
FIG. 28 is a block chart illustrating an exemplary functional structure of an image processing engine of an image processing apparatus of a fourth embodiment.
Figure 29:
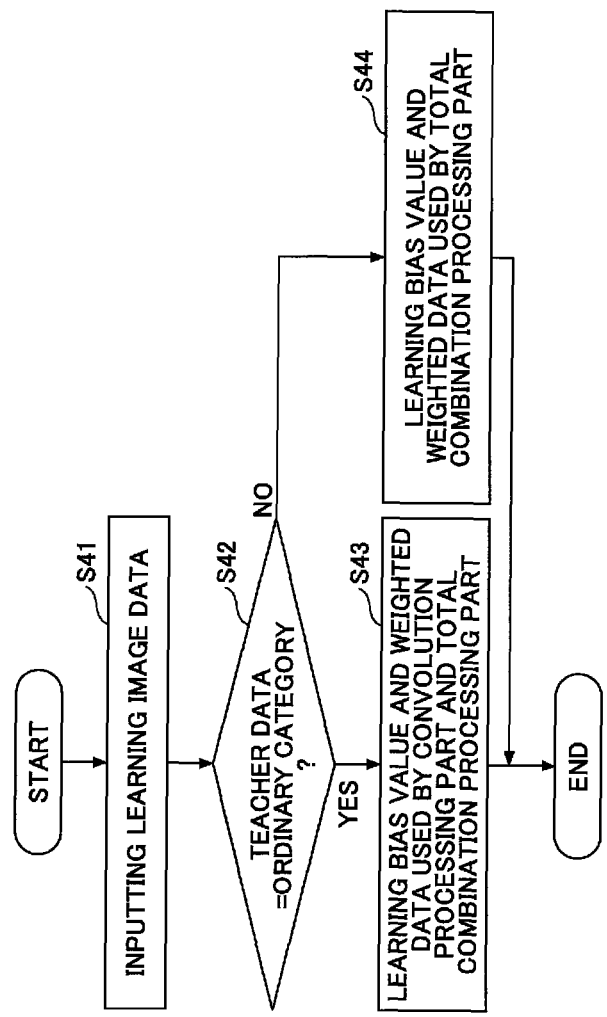
FIG. 29 is a flow chart illustrating an exemplary learning process of the image processing apparatus of the fourth embodiment.

A functional structure of the image processing engine 100 of the image processing apparatus 1 of the fourth embodiment is described. FIG. 28 is a block chart illustrating an exemplary functional structure of the image processing engine of the image processing apparatus of the fourth embodiment.

The functional structure of the image processing engine 100 of the image processing apparatus 1 of the fourth embodiment differs from that of the third embodiment at a point that a learning image data 4000 and a teacher data 5000 are included. As described above, the learning image data 4000 and the teacher data 5000 form the learning data.

The learning image data 4000 is image data used to learn the bias value and the weight data indicated by broken lines 6000A and 6000C, respectively. The learning is to update the bias value and the weighted data so that the output result from the learning image data 4000 fits the teacher data 5000. In a case where the teacher data 5000 is information indicative of the ordinary category, the learning of the bias value and the weight data indicative of broken lines 6000A and 6000C is performed. In a case where the teacher data 5000 is information indicative of the special category, the learning of the bias value and the weight data indicative of the broken line 6000C is performed.

The teacher data 5000 is a correct answer label of the learning image data 4000. Said differently, the teacher data 5000 indicates the specific genre of the category, to which the learning image data 4000 belongs.

<Detailed Process>

Next, the image processing apparatus 1 of the fourth embodiment is described. FIG. 22 is a flow chart illustrating an exemplary learning process of the image processing apparatus of the fourth embodiment.

In step S41, the input part 20 inputs the learning image data 4000 and the teacher data 5000. It is preferable to perform the learning by causing the learning image data 4000 and the teacher data 5000 of several thousands or tens of thousands pieces to be input in order to enable to classify various image data into an appropriate category. At this time, it is preferable to repeatedly input a predetermined number (for example, 128 data) of the learning data for each category.

In step S42, it is determined whether the input teacher data 5000 indicate the category included in the ordinary category or not. In a case where the teacher data 5000 are information indicative of the category included in the ordinary category, the process goes to step S43. In a case where the teacher data 5000 are information indicative of the category included in the special category, the process goes to step S44.

In step S43, the convolution processing part 30 and the total combination processing parts 50A1 to 50Am updates (learns) the bias value and the weight data, which are indicated by broken lines 6000A and 6000C, based on the learning image data 4000 and the teacher data 5000. This learning may be done using a conventional method such as an error inverse propagation method. Here, the bias value and the weight data, which are indicated by the broken line 6000A, are solely updated by the learning image data 4000 and the teacher data 5000. On the other hand, only a part of the bias value and the weight data, which are indicated by the broken line 6000C, is updated. The part of the bias value 2400A and the weight data 3400A to be updated corresponds to the specific genre of the ordinary category, to which the learning image data 4000 belongs (said differently, the specific genre of the ordinary category, to which the teacher data 5000 belongs). For example, in a case where the learning image data 4000 and the teacher data 5000 is the learning data for the ordinary category of "flower" and "other than flower", a learning target is only the bias value $2400A_1$ and the weight data $3400A_1$, which are used by the total combination processing part $50A_1$ corresponding to this ordinary category.

In the above step S43, after sufficiently performing the learning of the bias value and the weight data, it is unnecessary to perform the learning of the bias value and the weighted data, which are indicated by the broken line 6000A. For example, in a case where the ordinary category is added after sufficiently performing the learning of the bias value and the weight data, only learning of the bias value 2400A and the weight data 3400A, which correspond to the added ordinary category may be done. Thus, the amount of calculation accompanied by the learning process can be reduced.

In step S44, the total combination processing parts $50A_{m+1}$ to $50A_n$ of the special category updates (learns) the bias value and the weight data indicated by the broken line 6000C based on the learning image data 4000 and the teacher data 5000. This learning may be done using a conventional method such as an error inverse propagation method. Here, only a part of the bias value and the weight data, which are indicated by the broken line 6000C, is updated. The part of the bias value 2400A and the weight data 3400A to be updated correspond to the specific genre of the special category, to which the learning image data 4000 belongs (said differently, the specific genre of the special category, to which the teacher data 5000 belongs). For example, in a case where the learning image data 4000 and the teacher data 5000 is the learning data for the special category of "flower" and "other than flower", a learning target is only the bias value $2400A_{m+1}$ and the weight data $3400A_{m+1}$, which are used by the total combination processing part $50A_{m+1}$ corresponding to this special category.

[Fifth Embodiment]

Next, the image processing apparatus 1 of the fifth embodiment is described. Within the fifth embodiment, the learning process of the image processing apparatus 1 described in the second embodiment is described further in detail. The learning process described in the fourth embodiment is substantially similar. Therefore, the learning process of the fourth embodiment is properly explained.

<Detailed Process>

Figure 30:
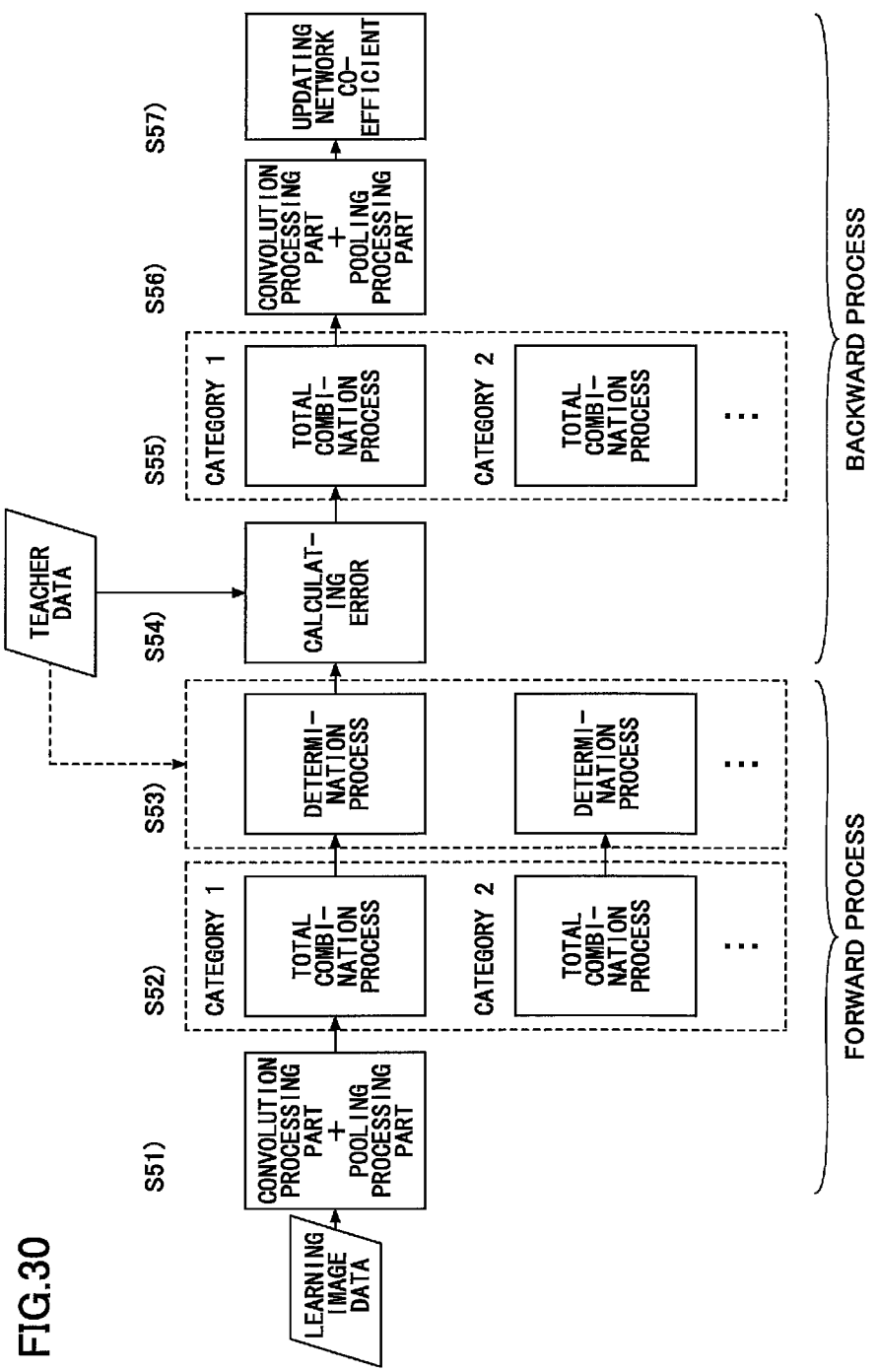
FIG. 30 illustrates an exemplary learning process of a fifth embodiment.

At first, a summary of the learning process in the image processing apparatus 1 of the fifth embodiment is described. FIG. 30 illustrates an exemplary learning process of the fifth embodiment. Within the fifth embodiment, an error inverse propagation method is used to learn (update) the bias values 2100 to 2400 and the weight data 3100 to 3400. Referring to FIG. 30, the error inverse propagation method includes a forward process and a backward process. The forward process is from a lower layer to a higher layer of the convolution neural network N. The backward process is from the lower layer to the higher layer of the convolution neural network N.

At first, the learning image data 4000 and the teacher data 5000 are input into the convolution neural network N. Then, the convolution process, the pooling process, and the total combination processes are performed based on the learning image data 4000 (steps S51 to S52). A process similar to the category identification process described in the first and third embodiments is performed.

Next, it is determined whether each total combination processing part 50 is a learning target based on the teacher data 5000 (step S53). Then, an error between the output result from the total combination processing part 50 to be determined and the teacher data 5000 is calculated (step S54).

Subsequently, the total combination processes, the convolution process, and the pooling process in the backward process are performed based on the calculated error (steps S55 to S56). The network coefficients (the bias values 2100 to 2400 and the weight data 3100 to 3400) are updated based on the result obtained by the total combination processes, the convolution process, and the pooling process in the backward process (step S57).

As described, in the error inverse propagation method, the error between the output value of the forward process and the teacher data is calculated, and the error is propagated from the higher layer to the lower layer. Thus, the network coefficients are updated.

<Detailed Process>

Figure 31:
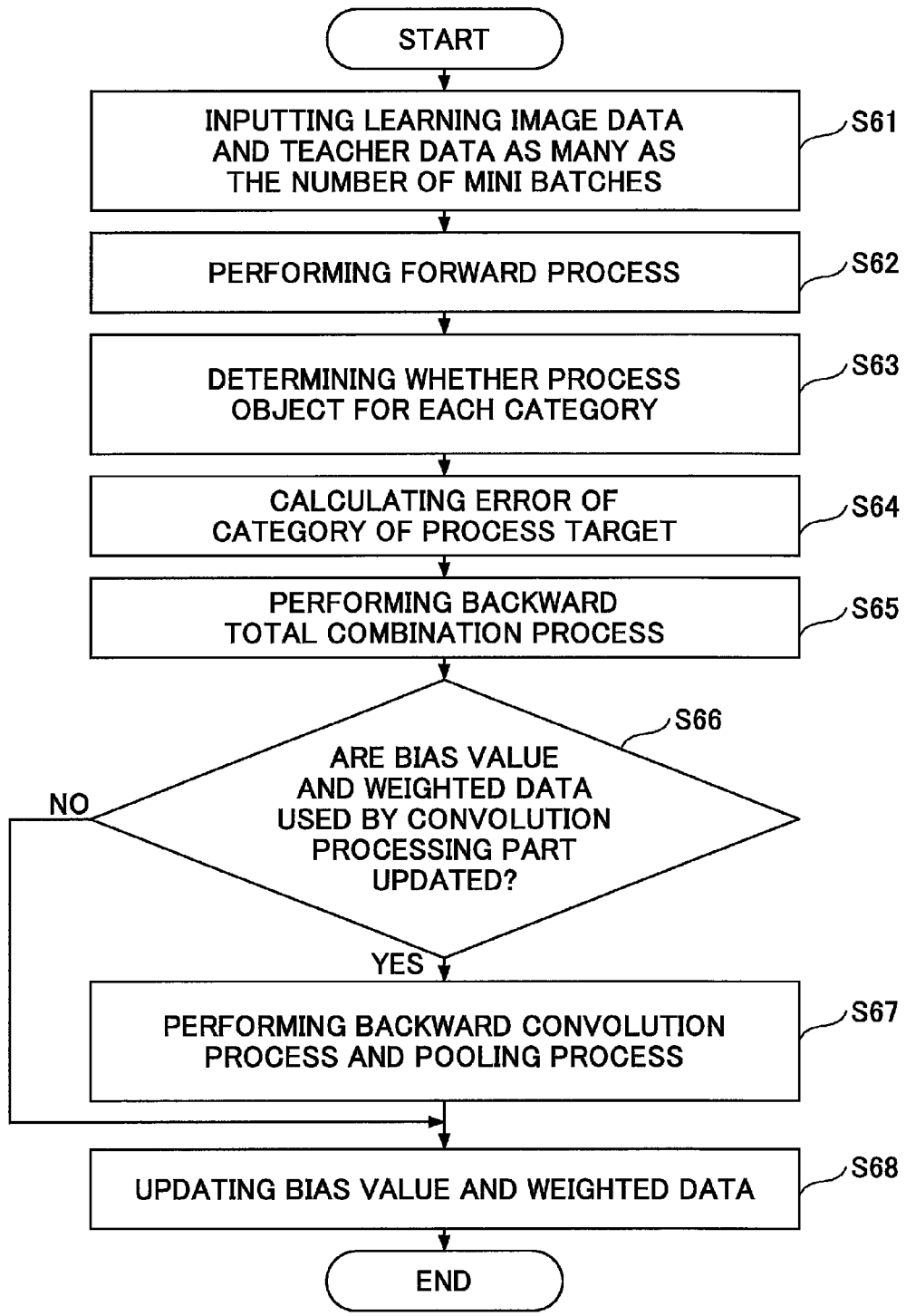
FIG. 31 is a flow chart illustrating an exemplary learning process of an image processing apparatus of the fifth embodiment.

Next, the image processing apparatus 1 of the fifth embodiment is described. FIG. 31 is a flow chart illustrating an exemplary learning process of the fifth embodiment.

In step S61, the input part 20 inputs the learning image data 4000 and the teacher data 5000 as many as the number of mini batches. Here, the number of mini batches is, for example, several tens to several hundreds. In the learning process of the fifth embodiment, processes of steps S61 to S67 are repeatedly performed for the learning image data 4000 and the teacher data 5000 as many as several thousands to several tens of thousands.

When the category includes the ordinary category and the special category (the fourth embodiment), the learning process is firstly performed for the learning image data 4000 and the teacher data 5000 of the ordinary category. Thereafter, the learning may be performed for the learning image data 4000 and the teacher data 5000 of the special category.

In step S62, the convolution processing part 30, the pooling processing part 40, and the total combination processing part 50 perform the forward process. Said differently, a process similar to the category identification process is performed based on the learning image data 4000 input by the input part 20.

In step S63, the normalization processing part 60 determines whether each total combination processing part 50 is the learning target based on the teacher data 5000. Said differently, the normalization processing part 60 determines that the total combination processing part 50 corresponding to the category, to which the learning image data belongs, is the learning target based on the teacher data 5000. Here, the bias value 2400 and the weight data 3400 used by the total combination processing part 50, which is determined to be the learning target, are a network coefficient to be updated in the 4th layer. As described, in the 4th layer, all the bias values 2400 and all the weight data 3400 are not updated. In the 4th layer, only a part of the bias values 2400 and a part of the weight data 3400, which are used by the total combination processing part 50 of the learning target, are updated.

For example, in a case where the learning image data 4000 belongs to the category of "flower" and "other than flower" (said differently, the value of the teacher data is, for example, ("flower", "other than flower")=(1,0)), the total combination processing part 50 corresponding to the category of "flower" and "other than flower" is determined to be the learning target. Therefore, the bias value 2400 and the weight data 3400 used by the total combination processing part 50 corresponding to the category of "flower" and "other than flower" are the network coefficients to be updated in the 4th layer.

The number of the total combination processing part 50 determined as the learning target may be 2 or greater. In a case where the learning image data 4000 belongs to the category of "flower" and "other than flower" and the category of "automobile" and "other than automobile", it is possible to determine that the total combination processing parts 50 respectively corresponding to these two categories of "flower" and "other than flower" and of "automobile" and "other than automobile" are the learning target.

In step S64, the normalization processing part 60 calculates the error based on the output value from the total combination processing part 50 determined as the learning target and the teacher data 5000. Specifically, an error $\delta=(z_1-T_1,z_2-T_2)$ between a value $(z_1,z_2)$ obtained by normalizing the output value from the total combination processing part 50 determined as the learning target by the normalization processing part 60 and a value $(T_1,T_2)$ of the teacher data 5000 is calculated. The calculated error $\delta$ is a value propagated to the lower layer. The bias value and the weight data are updated so as to make the error $\delta$ small.

Figure 32:
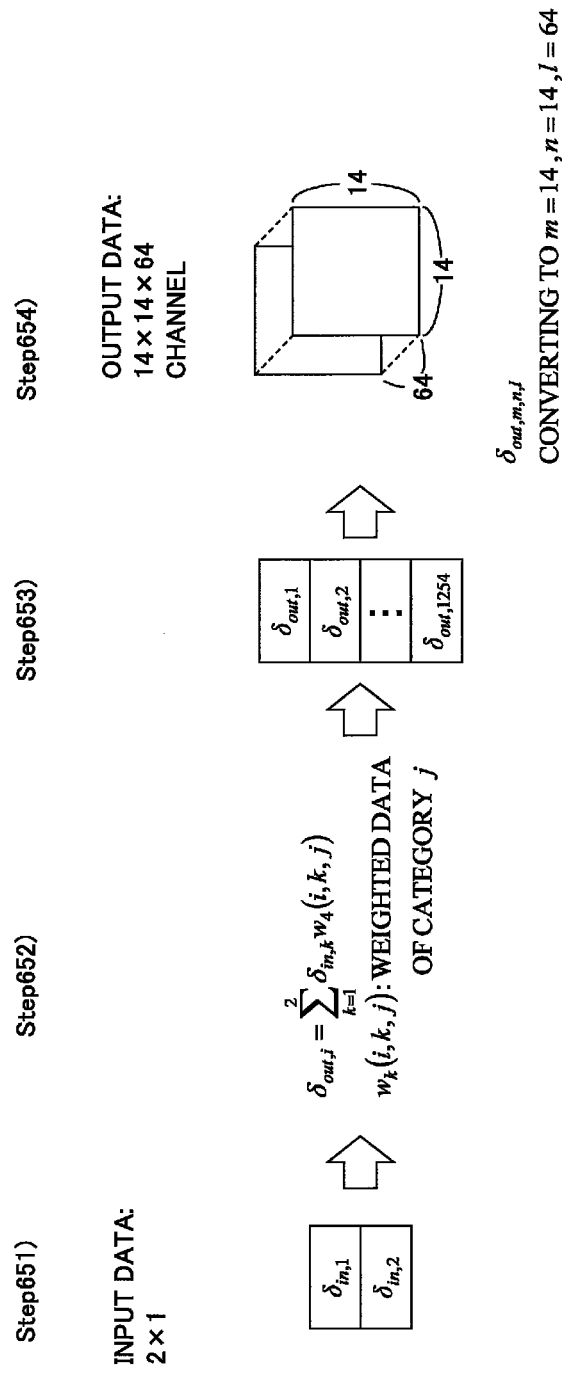
FIG. 32 illustrates an exemplary total combination process in a backward direction of a fifth embodiment.

In step S65, the total combination processing part 50 performs the total combination process in the backward direction. The total combination processing part 50 performing the total combination process is the total combination processing part 50 determined as the learning target in the above step S63. As described, the error $\delta$ is propagated only to the total combination processing part 50 in the backward process without propagating the error $\delta$ to all the total combination processing parts 50. Referring to FIG. 32, the total combination process in the backward direction performed by the total combination processing part $\mathbf{50}_k$ of the category k, which is determined to be the learning target in the above step S63, is described. FIG. 32 illustrates an exemplary total combination process in the backward direction of the fifth embodiment.

In step 651, the total combination processing part $\mathbf{50}_k$ inputs an error $\delta=\delta_{in}=(\delta_{in,1}, \delta_{in,2})$ from the normalization processing part 60.

In step 652, the total combination processing part $\mathbf{50}_k$ calculates an output value $\delta_{in,1}$ based on the weight data $\mathbf{3400}_k$.

In step 653, the total combination processing part $\mathbf{50}_k$ converts the calculated output value $\delta_{in,1}$ (a vector data of 12544 dimensions) to $\delta_{out,m,n,1}$ of 14×13×64 channels.

In step 654, the total combination processing part $\mathbf{50}_k$ outputs $\delta_{out,m,n,1}$.

In the above step S65, the total combination processing part $\mathbf{50}_k$ calculates a gradient of the network coefficient based on the error $\delta_{in}$, adds the gradients as many as the number of mini batches respectively for the same categories, and stores these in a memory device such as the SRAM 109. Said differently, the total combination processing part $\mathbf{50}_k$ calculates as follows, and the results of the calculation are added respectively for the same categories and are stored in the memory device.

$$\frac{\partial C}{\partial b_4(k,j)} = \delta_{in,j}, \quad \frac{\partial C}{\partial w_4(i,j,k)} = \delta_{in,j} y_i \quad \text{[Formula 6]}$$

where k: category, $j = 1, 2, i = 1, \ldots, 12544$,

C: cross entropy error, $y_j$: input from lower layer in forward process

In step S66, the total combination processing part $\mathbf{50}_k$ determines whether the error $\delta_{out,m,n,1}$ is propagated to the lower layer or not. In a case where the error $\delta_{out,m,n,1}$ is propagated to the lower layer, the process goes to step S67. In a case where the error $\delta_{out,m,n,1}$ is not propagated to the lower layer, the process goes to step S68.

In the case where the error $\delta_{out,m,n,1}$ is not propagated to the lower layer, for example, the bias value and the weight data of the lower layer (the convolution processing part 30 and the pooling processing part 40) are sufficiently learnt. In a case where the learning is performed for the learning image data 4000 and the teacher data 5000 of the special category (the fourth embodiment), the error $\delta_{out,m,n,1}$ is not propagated to the lower layer. The above determination process may be determined by the total combination processing part 50 based on a learning state of the network coefficient of the value of the teacher data 5000. Alternatively, the user may select whether the error $\delta_{out,m,n,1}$ is propagated to the lower layer or not.

In step S67, the convolution processing part 30 and the pooling processing part 40 perform the convolution process and the pooling process 40 in the backward direction. Hereinafter, the convolution process in the 3rd layer in the backward direction and the pooling process in the 2nd layer in the backward direction are described. The convolution process in the 2nd layer and the 1st layer in the backward direction is similar to the convolution process in the 3rd layer in the backward direction except for the number of the data channels. Therefore, the description is omitted. The pooling process in the 1st layer in the backward direction is substantially similar to the pooling process in the 2nd layer in the backward direction except for the number of the data channels. Therefore, the description is omitted.

Figure 33:
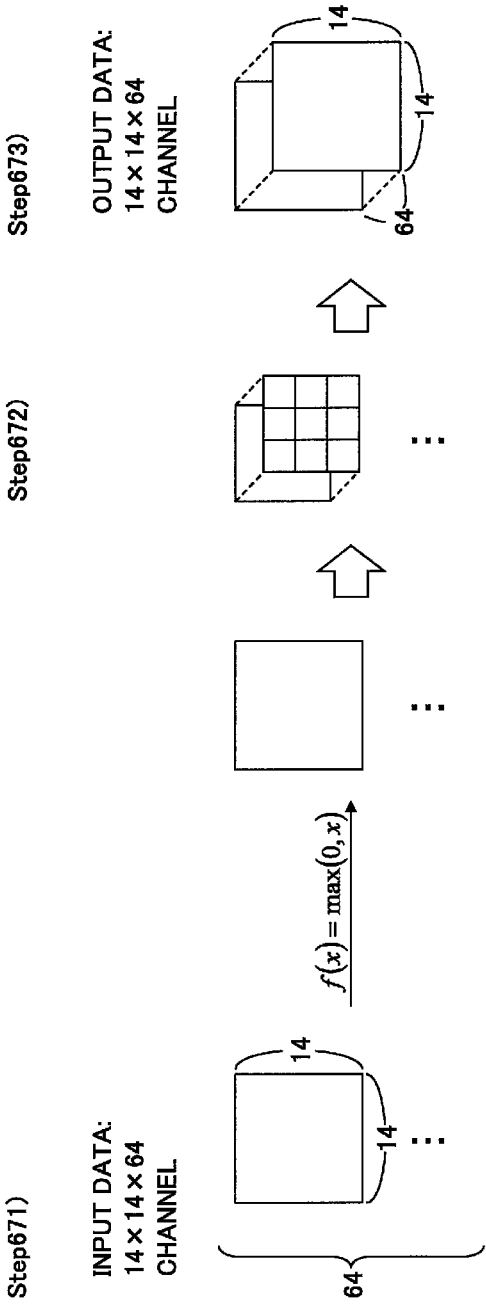
FIG. 33 illustrates an exemplary convolution process in the backward direction for the 3rd layer of the first embodiment.

Referring to FIG. 33, the convolution process of the 3rd layer in the backward direction is explained. FIG. 33 illustrates an exemplary convolution process for the 3rd layer in the backward direction of the fifth embodiment.

In step 671, the convolution processing part 303 inputs the error $\delta_{out,m,n,1}$ from the higher layer. Here, the input error $\delta_{out,m,n,1}$ is changed to "$\delta_{in,m,n,1}$." The convolution processing part $\mathbf{30}_3$ applies a predetermined activating function to the error $\delta_{out,m,n,1}$. The predetermined activating function is, for example, a function defined by f(x)=max(0,x), where x represents an arbitrary pixel value.

In step 672, the convolution processing part $\mathbf{30}_3$ generates a filter of 3×3×64 from the weight data 3300, and applies the generated filter to the error $\delta_{out,m,n,1}$ applied with the predetermined activating function. In a manner similar to the convolution process in the forward direction, the filter is applied to the entire error $\delta_{out,m,n,1}$ applied with the predetermined activating function while shifting the position of the filter, and obtained results are added.

In step 673, the convolution processing part 30₃ outputs the error $\delta_{out,m,n,1}$ after applying the above filter.

Figure 34:
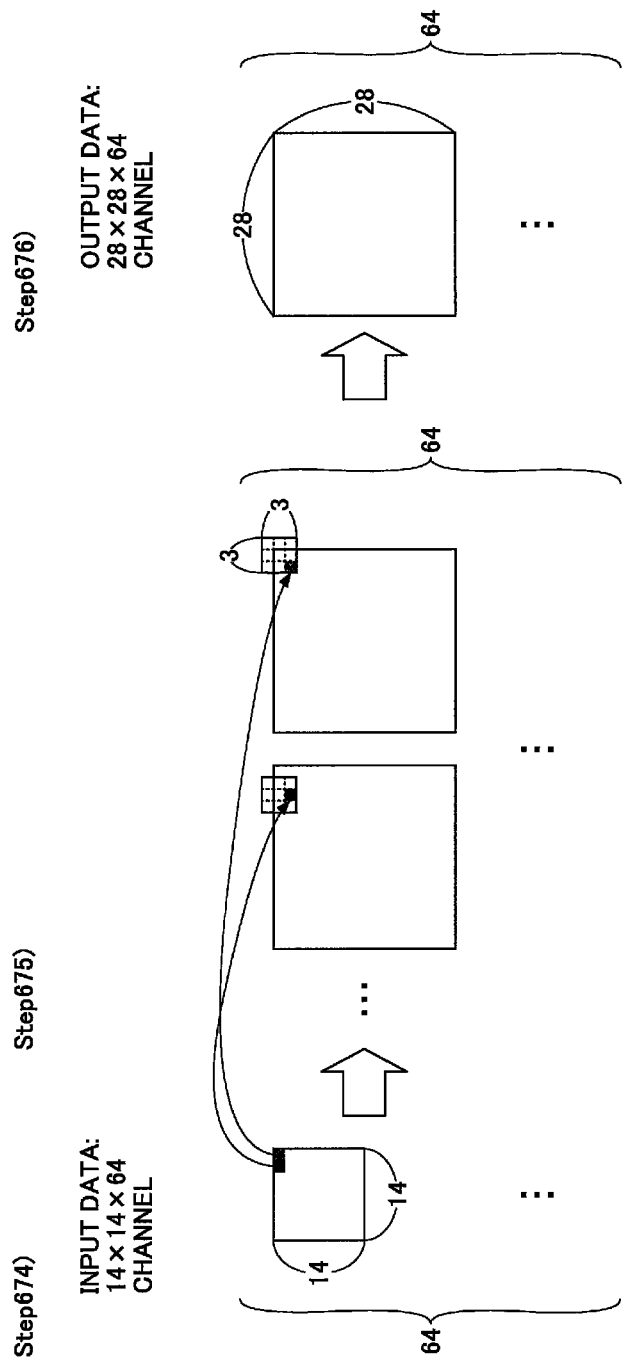
FIG. 34 illustrates an exemplary pooling process in the backward direction for the 2nd layer of the first embodiment.

In the above step S66, the convolution processing part 30₃ calculates a gradient of the network coefficient based on the error $\delta_{out,m,n,1}$, adds the gradients as many as the number of mini batches, and stores these in the memory device such as the SRAM 109. Here, when the filter of 3×3×64 is transformed into 576×1 dimension for one point (one value) of the error $\delta_{out,m,n,1}$, the gradient of the network coefficient can be calculated as follows.

$$\delta_{out}, i = \delta_{in}, w_3(i, l), \frac{\partial C}{\partial w_3(i, l)} = \delta_{in,l} y_i, \frac{\partial C}{\partial b_3(l)} = \sum_{m,n} \delta_{in,m,n,l} \quad \text{[Formula 7]}$$

where $i = 1, \ldots, 576, m = 1, \ldots, 14$, $n = 1, \ldots, 14, l = 1, \ldots, 64$, C: cross entropy error, $y_i$: input from lower layer in forward process Referring to FIG. 34, the pooling process of the 2nd layer in the backward direction is explained. FIG. 34 illustrates an exemplary pooling process for the 2nd layer in the backward direction of the fifth embodiment.

In step 674, the pooling processing part 40₂ outputs $\delta_{out,m, n, 1}$. Here, the input error $\delta_{out,m,n,1}$ is changed to "$\delta_{in,m,n,1}$".

In step 675, the pooling processing part 40₂ adds the corresponding error $\delta_{in,m,n,1}$ to a pixel value of a pixel outputting the maximum value in the forward process. Said differently, the maximum values output by the forward process are denoted by $M_{m,n,1}$, $\delta_{out,m,n,1}$ is added to each $M_{m,n,1}$, so as to generate an error $\delta_{out,m',n'1}$. Here, m'=1, . . . 28, and n'=1, . . . 28.

In step 676, the pooling processing part 40₂ outputs the above error $\delta_{out,m',n',1}$ of 28×28×64. This error $\delta_{out,m',n',1}$ of 28×28×64 is propagated to the convolution processing part 50₂.

In step S68, the convolution processing part 30 and the total combination processing part 50 update the bias values 2100 to 2400 and weight data 3100 to 3400. In a case where it is determined that the error is not propagated to the lower layer in step S66, the bias values 2100 to 2400 and weight data 3100 to 3400 are not updated (said differently, the convolution processing part 30 does not update the network coefficient).

Here, the total combination processing part 50 updates the bias value 2400 and the weight data 3400 by, for example, the following method (i.e., a gradient descent method). In the following formula, "sum ( )" represents the sum of gradients of the network coefficients stored in the memory device in step S65. Further, in the certain category k, $w_4(i,j,k)$ is represented by $w_{ij}$, and $b_4(k,j)$ is represented by $b_j$. Therefore, the following formula is calculated for each category (said differently, each total combination processing part 50), and the bias value 2400 and the weight data 3400 corresponding to the total combination processing part 50 are updated.

$$\Delta w_{ij}(t) = -\varepsilon * \text{sum}\left(\frac{\partial C}{\partial w_{ij}}\right) + \alpha \Delta w_{ij}(t-1) - \varepsilon \lambda w_{ij} \quad \text{[Formula 8]}$$

$$w_{ij}(t+1) = w_{ij}(t) + \Delta w_{ij}(t)$$

$$\Delta b_j(t) = -\varepsilon * \text{sum}\left(\frac{\partial C}{\partial b_j}\right) + \alpha \Delta b_j(t-1) - \varepsilon \lambda b_j$$

$$b_j(t+1) = b_j(t) + \Delta b_j(t)$$

where $\varepsilon$: learning coefficient, $\alpha$: inertia term, $\lambda$: normalization coefficient Here, the total combination processing part 30 updates the bias values 2100 to 2300 and the weight data 3100 to 3300 by, for example, the following method (i.e., the gradient descent method). In the following formula, "sum ( )" represents the sum of gradients of the network coefficients stored in the memory device in step S66. In an x-th layer, $w_x(i,1)$ is represented by $w_{i1}$, and $b_x(1)$ is represented by b(1). Therefore, the following formula is calculated for each layer, and the bias value and the weight data corresponding to the convolution processing part 30 in the layer are updated.

$$\Delta w_{il}(t) = -\varepsilon * \text{sum}\left(\frac{\partial C}{\partial w_{il}}\right) + \alpha \Delta w_{il}(t-1) - \varepsilon \lambda w_{il} \quad \text{[Formula 9]}$$

$$w_{il}(t+1) = w_{il}(t) + \Delta w_{il}(t)$$

$$\Delta b_l(t) = -\varepsilon * \text{sum}\left(\frac{\partial C}{\partial b_l}\right) + \alpha \Delta b_l(t-1) - \varepsilon \lambda b_l$$

$$b_l(t+1) = b_l(t) + \Delta b_l(t)$$

where $\varepsilon$: learning coefficient, $\alpha$: inertia term, $\lambda$: normalization coefficient As described, the bias values 2100 to 2400 and the weight data 3100 to 3400 of the convolution neural network N are learnt (updated).

<General Overview>

As described, the image processing apparatus 1 of the first embodiment can calculate the certainty factor indicative of whether the input image data 1000 belong to any category using the convolution neural network N. At this time, the convolution processing part 30 and the pooling processing part 40 are commonly used for all the categories and the total combination processing part 50 is provided for each of the categories. Therefore, it is possible to flexibly follow an addition or a deletion of the category, and an increase of calculation or a memory amount accompanied by the addition of the category can be prevented.

Further, according to the image processing apparatus 1 of the first embodiment, the certainty factors of different categories can be compared by providing the normalization process with the certainty factors calculated by using the convolution neural network N. Further, in a case where an image belongs to specific genres (e.g., "flower" and "automobile") of multiple categories, an appropriate certainty factor is obtainable by providing the normalization process.

The image processing apparatus 1 of the second embodiment can update (learn) the bias value and the weight data used by the convolution neural network N based on the learning data. Here, in a case where a category is added or deleted, only the bias value and the weight data used by the total combination processing part 50 may be updated (learnt). Therefore, it is possible to deal with the addition or the deletion of the category.

As described, the image processing apparatus 3 of the first embodiment can calculate the certainty factor indicative of whether the input image data 1000 belong to any category using the convolution neural network N. When there is an image data apt to be erroneously distinguished, and there is a shift (an unbalance in the numbers of the positive and negative examples) in the positive examples of the learning data between the categories, which are apt to be erroneously distinguished, an appropriate certainty factor can be calculated to prevent the erroneous distinction.

The image processing apparatus 1 of the fourth embodiment can update (learn) the bias value and the weight data used by the convolution neural network N based on the learning data. Even in a case where negative examples for preventing the erroneous distinction with the other category cannot be sufficiently prepared, the bias values and the weight data to be learnt are limited to a predetermined range. Therefore, appropriate learning can be done.

According to an embodiment of the present invention, it is possible to support an appropriate category classification of an image data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an image processing apparatus has been described in detail, it should be understood that various changes, substitutions, and alterations could be made thereto without departing from the spirit and scope of the invention.

This application is based upon and claims the benefit of priority of the prior Japanese Patent Application No. 2014-101450, filed on May 15, 2014, the Japanese Patent Application No. 2014-156488, filed on Jul. 31, 2014, and the Japanese Patent Application No. 2015-006529, filed on Jan. 16, 2015, the entire contents of which are incorporated herein by reference.

What is claimed is:

1. An image processing apparatus that calculates a first certainty factor indicative of a degree of classifying an input image data into at least one first category, the image processing apparatus comprising a hardware processor that executes a program to implement:
a convolution processing unit forming a (n−1)-th layer of a convolutional neural network, the convolution processing unit being configured to perform a convolution process using a first coefficient previously learnt by the convolution processing unit;
first and second total combination processing units forming a n-th layer of the convolutional neural network, the first and second total combination processing units being
prepared for each of the at least one first category and each of at least one second category, respectively, configured to perform first and second total combination processes for a processing result obtained by the convolution processing unit using second and third coefficients previously learnt by the first and second total combination processing units, respectively, and configured to calculate a first candidate certainty factor indicative of the degree of classifying the input image data into the at least one first category and a second candidate certainty factor indicative of a degree of classifying the input image data into the at least one second category, respectively; and
a normalization unit which performs normalization of processing results obtained by the first and second total combination processing units for each of the at least one first category and the at least one second category,
wherein the convolution processing unit performs learning of the first coefficient in common with the at least one first category, and
wherein the first and second total combination processing units perform learning of the second coefficient for each of the at least one first category and learning of the third coefficient for each of the at least one second category.

2. The image processing apparatus according to claim 1, wherein each of the plurality of categories is a pair of a specific genre and another genre other than the specific genre, and
wherein the first and second total combination processing units calculate the first certainty factor, with which the input image data belongs to the specific genre, and a second certainty factor, with which the input image data belongs to the another genre.

3. The image processing apparatus according to claim 2, wherein the normalization unit normalizes the first and second certainty factors using [Formula 10] and [Formula 11], respectively, as follows:

$$Z_1(k) = \frac{\exp(y_1(k))}{\exp(y_1(k)) + \exp(y_2(k))} \quad \text{[Formula 10]}$$

$$Z_2(k) = \frac{\exp(y_2(k))}{\exp(y_1(k)) + \exp(y_2(k))}, \quad \text{[Formula 11]}$$

k represents a numerical value indicative of a category,
where $Z_1(k)$ designates 1st normalized candidate certainty factor,
where $Z_2(k)$ designates 2nd normalized candidate certainty factor,
where $y_1(k)$ designates 1st candidate certainty factor, and
where $y_2(k)$ designates 2nd candidate certainty factor.

4. The image processing apparatus according to claim 1, wherein the learning is performed by an error inverse propagation method.

5. A method of processing an input image performed in an image processing apparatus that calculates a first certainty factor indicative of a degree of classifying an input image data into at least one first category, the method comprising:
forming a (n−1)-th layer of a convolutional neural network by performing a convolution process, by a convolution processing unit included in the image processing apparatus, using a first coefficient previously learnt by the convolution processing unit;
performing, by first and second total combination processing units which are included in the image processing apparatus, form a n-th layer of the convolutional neural network, and are respectively prepared for each of the at least one first category and each of at least one second category first and second total combination processes for a processing result obtained by the performing of the convolution process using second and third coefficients previously learnt by the first and second total combination processing units, respectively;

calculating, by the first and second total combination processing units, a first candidate certainty factor indicative of the degree of classifying the input image data into the at least one first category and a second candidate certainty factor indicative of a degree of classifying the input image data into the at least one second category, respectively; and performing, by a normalization unit, normalization of processing results obtained by the first and second total combination processing units for each of the at least one first category and the at least one second category, wherein the convolution processing unit performs learning of the first coefficient in common with the at least one first category, and wherein the first and second total combination processing units perform learning of the second coefficient for each of the at least one first category and learning of the third coefficient for each of the at least one second category.

* * * * *